United States Patent [19]
Ono et al.

[11] Patent Number: 6,097,525
[45] Date of Patent: Aug. 1, 2000

[54] METHOD FOR GENERATING DUOBINARY SIGNAL AND OPTICAL TRANSMITTER USING THE SAME METHOD

[75] Inventors: Takashi Ono; Yutaka Yano, both of Tokyo, Japan

[73] Assignee: NEC Corporation, Tokyo, Japan

[21] Appl. No.: 08/912,937

[22] Filed: Aug. 15, 1997

[30] Foreign Application Priority Data

Aug. 16, 1996 [JP] Japan .................................. 8-216432
Jan. 14, 1997 [JP] Japan .................................. 9-004203

[51] Int. Cl.[7] .................................................. H04B 10/04
[52] U.S. Cl. .......................... 359/181; 359/180; 359/183; 375/291
[58] Field of Search .................................... 359/181, 183, 359/180, 156; 375/291

[56] References Cited

U.S. PATENT DOCUMENTS

| | | | |
|---|---|---|---|
| 5,008,957 | 4/1991 | Kiyono .................................... | 415/668 |
| 5,373,382 | 12/1994 | Pirio et al. ............................. | 359/181 |
| 5,473,458 | 12/1995 | Mamyshev et al. .................... | 359/181 |
| 5,477,375 | 12/1995 | Korotky et al. ........................ | 359/183 |
| 5,515,196 | 5/1996 | Kitajima et al. ....................... | 359/180 |
| 5,543,952 | 8/1996 | Yonenaga et al. ..................... | 359/181 |

FOREIGN PATENT DOCUMENTS

| | | |
|---|---|---|
| 0565035 | 10/1993 | European Pat. Off. . |
| 0701338 | 3/1996 | European Pat. Off. . |
| 6-209293 | 7/1994 | Japan . |
| 8-139680 | 5/1996 | Japan . |
| 8139681 | 5/1996 | Japan . |
| 09236781 | 9/1997 | Japan . |
| 9-236781 | 9/1997 | Japan . |
| 9-247087 | 9/1997 | Japan . |

OTHER PUBLICATIONS

Patent Abstracts of Japan, vol.098, No. 001, Jan. 30, 1998, Japanese Publication No. 09236781.
Adam Lender, "Correlative level coding for binary–data transmission", *IEEE Spectrum*, Feb. 1966, pp. 104–115.
A. J. Price et al., "210 km Repeaterless 10Gb/s Transmission Experiment Through Nondispersion–Shifted Fiber Using Partial Response Scheme", *IEEE Photonics Technology Letters*, vol. 7, No. 10, Oct. 1995, pp. 1219–1221.

*Primary Examiner*—Kinfe Michael Negash
*Attorney, Agent, or Firm*—Sughrue, Mion, Zinn, Macpeak & Seas, PLLC

[57] ABSTRACT

Disclosed is a method for generating a duobinary signal which has the step of: modulating individually an intensity and a phase of a carrier wave. Also disclosed is a duobinary-manner optical transmitter which has: a laser device which outputs signal light; an optical intensity modulator which intensity-modulates the signal light according to a first data signal generated by dividing a data signal into two signals; a precoder which inputs a second data signal generated by dividing the data signal into two signals; and an optical phase modulator which phase-modulates the intensity-modulated signal light according to a signal which is obtained delaying 0.5 bit an output signal of the precoder.

15 Claims, 29 Drawing Sheets

FIG. 10A INPUT DATA SIGNAL 6

FIG. 10B OUTPUT OF PRECODER 7

FIG. 10C AMPLITUDE (NORMALIZED) OF SIGNAL LIGHT 4

FIG. 10D PHASE OF SIGNAL LIGHT 4

INPUT WAVEFORM → OUTPUT WAVEFORM

FIG. 19

| INPUT DATA SIGNAL 6 D(i) | INPUT DATA SIGNAL 6 1-BIT BEFORE D(i-1) | MAPPING TO THREE-LEVEL D(i)+D(i-1) | OUTPUT DATA SIGNAL 40a ($Q_0$) | OUTPUT DATA SIGNAL 40b ($Q_\pi$) |
|---|---|---|---|---|
| 0 | 0 | 0 | 0 | 1 |
|   | 1 | 1 | 0 | 0 |
| 1 | 0 | 1 | 1 | 1 |
|   | 1 | 2 | 1 | 0 |

$Q_0 = D(i)$,  $Q_\pi = \overline{D(i-1)}$

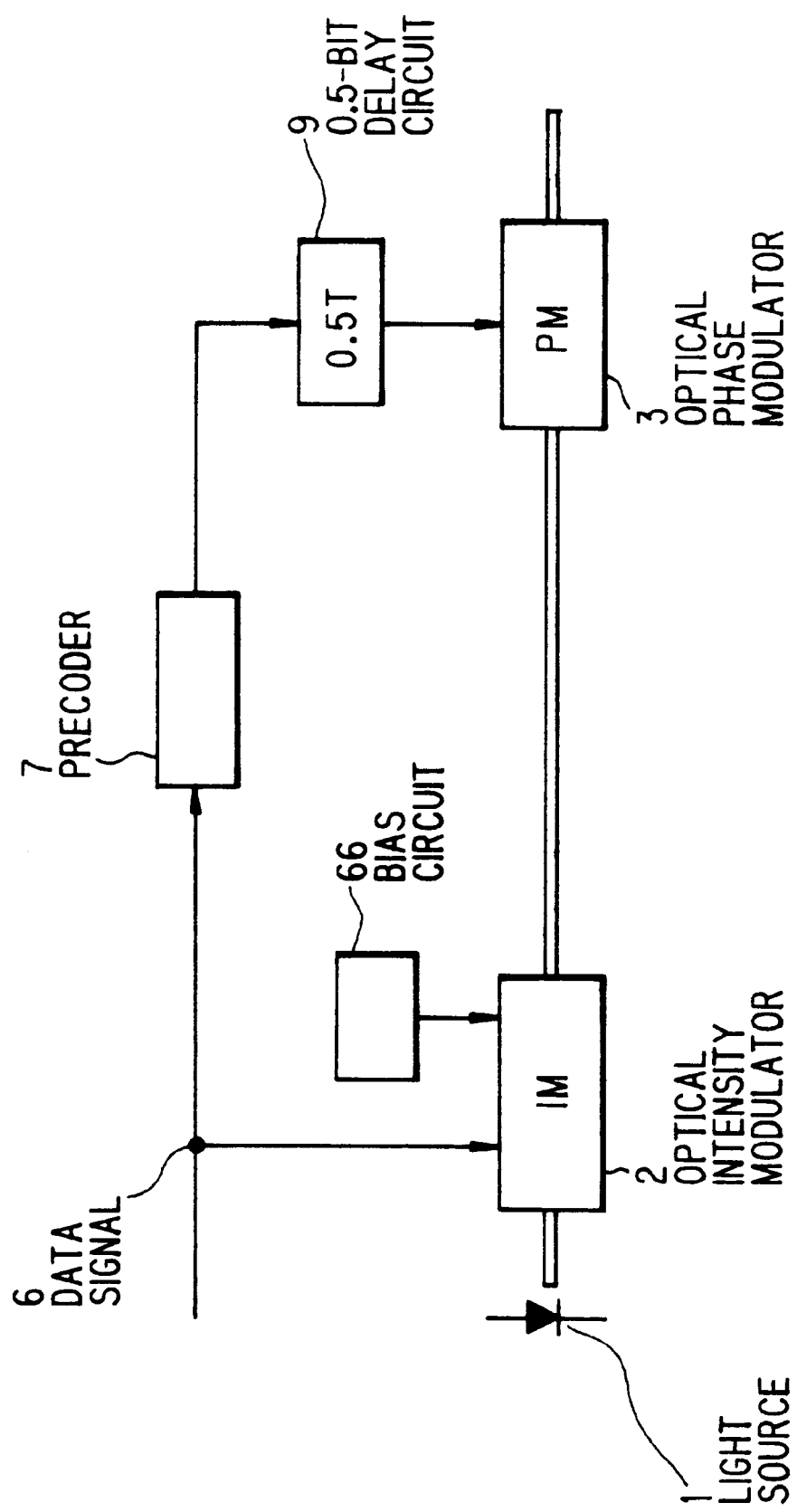

METHOD FOR GENERATING DUOBINARY SIGNAL AND OPTICAL TRANSMITTER USING THE SAME METHOD

FIELD OF THE INVENTION

This invention relates to a method for generating a duobinary signal and an optical transmitter using the same method.

BACKGROUND OF THE INVENTION

Recently, an optical duobinary technique has attracted attention as an optical transmission manner which can overcome the waveform deterioration due to a chromatic dispersion. The duobinary technique itself has been researched for a long time and its theory system was established in the time of pulse communication with a coaxial cable. The duobinary technique is that a signal bandwidth (spectrum width) is reduced to less than ½ by mapping a binary data signal to be transmitted into a three-level signal with a redundancy in the amplitude direction. It has a merit that the waveform deterioration due to a dispersion etc. is difficult to happen since the spectrum width is narrowed. However, it had never attracted attention in high-speed optical communication since, in the receiver, a receiving circuit with a linearity is required to handle the three-level signal and a decoder for decoding the original binary data signal from the three-level signal is necessary.

A. J. Price et al., "210 km Repeaterless 10 Gb/s Transmission Experiment Through Nondispersion-Shifted Fiber Using Partial Response Scheme", IEEE PHOTONICS TECHNOLOGY LETTERS, Vol. 7, No. 10, pp. 1219–1221 (1995) reports an optical duobinary technique where a redundancy is given to optical phase.

The optical transmitter used in this optical duobinary technique is shown in FIG. 1. A binary data signal is passed through a low-pass filter, which is ideally a cosine roll-off filter, with a bandwidth of about 0.25 times a clock frequency. Due to the excessive limitation of bandwidth, the interference between codes is occurred to convert the binary data signal into a three-level data signal. Similarly, a binary inverted data signal is converted into a three-level data signal. Then, these signals are input with an amplitude equal to a half-wavelength voltage $V_\pi$ to a push-pull optical intensity modulator. The push-pull optical intensity modulator is a Mach-Zehnder(MZ) interferometer with modulation terminals connected to both arms, where unnecessary chirp(phase variation) does not occur. In this technique, the bias voltage is so adjusted that a three-level signal(−1, 0, 1) corresponds to a mountain(ON), a valley(OFF) and a neighboring mountain(ON) in the voltage-extinction characteristic of the push-pull optical intensity modulator. As a result, when the amplitude and phase of light are represented by (A, Φ), the data signal is mapped into three states of (1, 0), (0, indefinite) and (1, π) to generate optical duobinary signal light. This three-level signal light can be, as it is, decoded into the binary signal composed of 1 and 0 since the phase information is deleted by square-law detection when the direct detection is conducted by an optical detector. This means that direct-detection optical receivers, which are widely used, can be used as it is. It is one of the reasons why the duobinary technique has attracted attention again.

Japanese patent application laid-open No.8-139681(1996) discloses another optical duobinary system as shown in FIG. 2. In this system, as shown in FIG. 2, a binary transmission data signal 50 is converted into a three-level duobinary signal by a code converter 51. In the code converter 51, the code conversion is first conducted by a precoder 52 composed of an exclusive-OR circuit 26 and an 1-bit delay circuit 27, and then the duobinary signal is generated by a binary-to-three-level converter 53 composed of an 1-bit delay circuit 27 and an adder 54. The duobinary signal is divided into two signals, where the first signal divided is input through an amplitude adjusting circuit 55 and a bias adjusting circuit 56 to the first input terminal of an optical modulator 58 and the second signal divided is input through an inverter 57 and an amplitude adjusting circuit 55 to the second input terminal of the optical modulator 58. The optical modulator 58 is a Mach-Zehnder optical intensity modulator, where light from a light source 1 is modulated by applying the first and second signals to its two optical A waveguides to generate the optical duobinary signal.

When the two electrical signals with an amplitude equal to a half-wavelength voltage($V_\pi$) of the optical modulator 58 are input and the bias point of signal is set at a point (a) of transmission characteristics 59 of the modulator as shown in FIG. 3, the middle value of the duobinary signal 60 is assigned to a minimum transmittance state and the minimum and maximum values thereof are assigned to maximum transmittance states, where the optical phase is inverted by 180 degree between the minimum and maximum values. As a result, the three levels of the electrical signal can be assigned to the optical three states, thereby narrowing the modulated light spectrum. Meanwhile, this system has a composition equivalent to the system in FIG. 1 where the low-pass filters are replaced by the binary-to-three-level converter 53.

However, in the conventional methods, the driving amplifier of the modulator requires a linearity since the electrical signal for driving the optical modulator is three-level. On the other hand, the driving amplifier generally needs a high-output characteristic greater than 5 Vp-p. Therefore, there is a problem that designing the circuit becomes very difficult since the linearity and the high-output characteristic are required therein.

SUMMARY OF THE INVENTION

Accordingly, it is an object of the invention to provide a method for generating a duobinary signal where an electrical signal for driving an optical modulator is binary.

It is a further object of the invention to provide an optical transmitter where a binary electrical signal for driving an optical modulator is used to generate a duobinary signal.

According to the invention, a method for generating a duobinary signal, comprises the step of:

modulating individually an intensity and a phase of a carrier wave.

According to another aspect of the invention, a duobinary-manner optical transmitter, comprises:

a laser device which outputs signal light;

an optical intensity modulator which intensity-modulates the signal light according to a first data signal generated by dividing a data signal into two signals;

a precoder which inputs a second data signal generated by dividing the data signal into two signals; and an optical phase modulator which phase-modulates the intensity-modulated signal light according to a signal which is obtained delaying 0.5 bit an output signal of the precoder.

According to another aspect of the invention, a duobinary-manner optical transmitter, comprises:

a precoder which inputs a second data signal generated by dividing a data signal into two signals;

a direct modulation phase shift keying encoder which inputs an output of the precoder after delaying 0.5 bit the output;

a laser device which outputs signal light phase-modulated by modulating an injected current according to an output of the direct modulation phase shift keying encoder; and an optical intensity modulator which intensity-modulates the phase-modulated signal light according to a first data signal generated by dividing the data signal into two signals.

According to another aspect of the invention, a method for generating a duobinary signal, comprises the steps of:

providing two carrier waves with an equal frequency;

intensity-modulating individually the two carrier waves by first and second intensity modulators; and coupling the two intensity-modulated carrier waves so that they have a phase difference of π.

According to another aspect of the invention, a duobinary-manner optical transmitter, comprising:

a laser device which outputs signal light;

an optical divider which divides the signal light into two light signals;

a first optical intensity modulator which inputs first signal light divided by the optical divider;

a second optical intensity modulator which inputs second signal light divided by the optical divider;

an optical coupler which couples output lights of the first and second optical intensity modulators after phase-shifting at least one of the output lights so as to give a phase difference of π between the output lights of the first and second optical intensity modulators; and a precoder which inputs a data signal;

wherein the first optical intensity modulator is driven by a first encoded signal generated by dividing an encoded signal to be output from the precoder into two signals, and the second optical intensity modulator is driven by a signal which is obtained by delaying 1 bit a second encoded signal generated by dividing the encoded signal into the two signals, thereafter inverting 0 and 1 each other.

According to another aspect of the invention, a duobinary-manner optical transmitter, comprises:

a laser device which outputs signal light;

an optical intensity modulator which intensity-modulates the signal light according to a first data signal generated by dividing a data signal into two signals;

a precoder which inputs a second data signal generated by dividing the data signal into two signals; and an optical phase modulator which phase-modulates the intensity-modulated signal light according to a signal which is obtained delaying 0.5 bit an output signal of the precoder;

wherein a waveform of the signal light is varied by changing an operating point of the optical intensity modulator.

According to another aspect of the invention, a duobinary-manner optical transmitter, comprises:

a laser device which outputs signal light;

an optical intensity modulator which intensity-modulates the signal light according to a first data signal generated by dividing a data signal into two signals;

a precoder which inputs a second data signal generated by dividing the data signal into two signals; and an optical phase modulator which phase-modulates the intensity-modulated signal light according to a signal which is obtained delaying 0.5 bit an output signal of the precoder;

wherein a waveform of the first data signal is varied through a non-linear electric circuit.

According to another aspect of the invention, a method for generating a duobinary signal, comprises the step of:

modulating individually an intensity and a polarization of a carrier wave.

According to another aspect of the invention, a duobinary-manner optical transmitter, comprises:

a laser device which outputs signal light;

an optical intensity modulator which intensity-modulates the signal light according to a first data signal generated by dividing a data signal into two signals;

a precoder which inputs a second data signal generated by dividing the data signal into two signals; and an optical polarization modulator which polarization-modulates the intensity-modulated signal light according to a signal which is obtained delaying 0.5 bit an output signal of the precoder.

In the invention, an intensity modulator and a phase modulator are cascade-connected, and the amplitude(or intensity) and phase of signal light are individually modulated. Meanwhile, an intensity modulation signal and a phase modulation signal are input to the intensity modulator and phase modulator, respectively, while having predetermined conversion and phase relations. The conversion and phase relations will be explained below. FIG. 4 shows calculation results of the amplitude and phase of optical duobinary signal light modulated by a conventional three-level signal. As shown in FIG. 4, in the optical duobinary signal light, the phase is inverted from 0 to π or from π to 0 at a point where the amplitude is 0. The phase inversion occurs at the middle point of a 1 time slot. The phase does not change when the amplitude is 1. The characteristic that "the phase is inverted at a point where the amplitude is 0" gives the characteristics of optical duobinary manner that have a narrowed optical spectrum and a high durability against dispersion.

When a data signal is transmitted carrying on an optical amplitude(or intensity) and is directly detected by an optical receiver to get the data signal, only the phase modulation signal needs to be encoded by a precoder(encoder). The rule of the encoding is, as described earlier, that "the phase modulation signal is inverted when the intensity modulation signal is 0". This can be easily achieved by EX-NOR (inverted output of exclusive "or") and a 1-bit delay circuit, as shown in FIG. 9. The precoder uses an output value 1 bit before, therefore the output is inverted depending on an initial output value. However, there is no problem because an absolute optical phase has no meaning for optical duobinary signal light. After delaying 0.5 bit the phase modulation signal to the intensity modulation signal, the intensity-modulated signal light is phase-modulated(0–π). Thereby, the optical duobinary signal light can be generated. In such cascade modulation, any one of the optical phase modulator and the optical intensity modulator may be placed at the first.

Also, two lights with an equal frequency may be provided by, for example, dividing signal light into two lights, then turning OFF(or ON) either of the two lights or both of them by two optical intensity modulators, thereafter coupling them to give a phase difference of π between the outputs from the two optical intensity modulators. As a result, the data signal can be mapped into three optical states as described earlier to generate optical duobinary signal light (parallel type). In this case, a parallel-type precoder is necessary for the input data signal in addition to the above-mentioned precoder. The parallel-type precoder can be, as shown in FIGS. 20 and 21, composed of a simple circuit using a 1-bit delay circuit and an inverter.

Also, in the invention, by properly setting the optical intensity modulation waveform, modulated light closer to that in the optical duobinary modulation manner using the three-level signal can be obtained. In an ideal optical duobinary waveform, the cross point is biased upward as shown in FIG. 5A, where the optical spectrum has very small high-frequency components as shown in FIG. 5B. To suppress the high-frequency components, the invention approaches the ideal optical duobinary by using a non-linear modulation characteristic of the optical intensity modulator or an electric circuit with a non-linear input characteristic. When a signal 62 is input as shown in FIG. 6A, the obtained modulation light spectrum has high-frequency components to be remained as shown in FIG. 7A. On the contrary, when a signal 64 is input shifting the bias value, the output optical waveform 65, which is biased to the side of optical transmission, becomes closer to the ideal duobinary waveform, and the high-frequency components can also be suppressed as shown in FIG. 7B.

On the other hand, in the composition of cascade-connected intensity modulator and phase modulator, when the main axis direction of polarization of output signal light is supplied to be 45° to the optical axis of the phase modulator, only the signal light component in the optical axis direction is phase-modulated. Therefore the polarization of signal light can be modulated according to phase modulation. As a result, the spectrum of the signal light is not so narrowed, but the polarization-modulated duobinary signal can be generated.

BRIEF DESCRIPTION OF THE DRAWINGS

The invention will be explained in more detail in conjunction with the appended drawings, wherein:

FIG. 19 is a diagram showing an input-output logic table of a parallel-type precoder 39 in FIG. 18, FIG. 23 is a block diagram showing an optical transmitter in a tenth preferred embodiment according to the invention.

DESCRIPTION OF THE PREFERRED EMBODIMENTS

Figure 8:
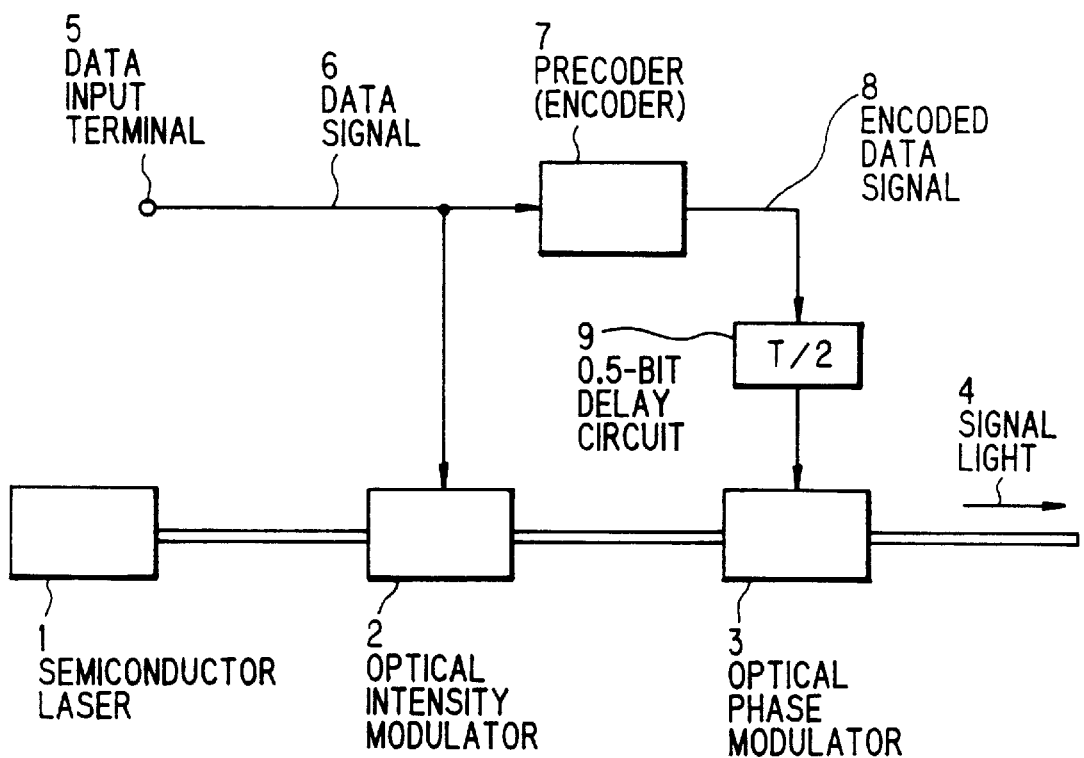
FIG. 8 is a block diagram showing an optical transmitter in a first preferred embodiment according to the invention.
Figure 9:
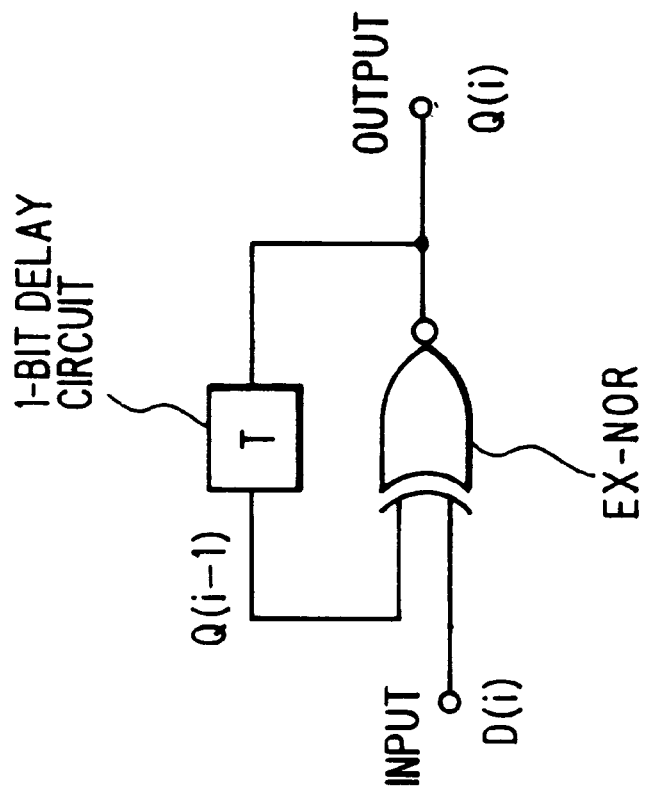
FIG. 9 is diagrams showing a circuit composition of a precoder 7 in FIG. 8 and an input-output logic table therein.
Figure 10:
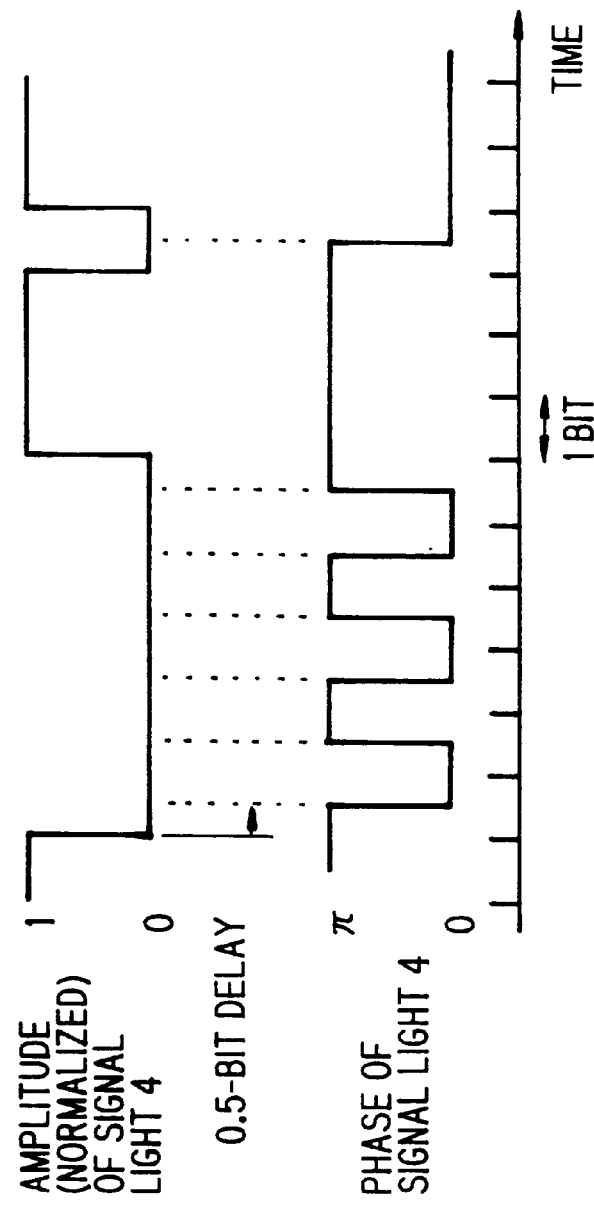
FIGS. 10A to 10D are diagrams showing the relation among the input and output of the precoder 7 and the amplitude and phase of signal light 4.

A method for generating a duobinary signal and an optical transmitter using the same method in the first preferred embodiment will be explained in FIG. 8. The first embodiment is adapted to an optical transmitter in an 10 Gb/s optical duobinary modulation-direct detection reception manner. As shown in FIG. 8, the output of a 1.5 μm band semiconductor laser 1 is input to a Mach-Zehnder(MZ) optical intensity modulator 2 which is composed of an lithium niobate(LiNbO$_3$, hereinafter referred to as 'LN') optical waveguide, and then its output is input to a LN optical phase modulator 3. The LN optical intensity modulator 2 turns ON or OFF the optical output according to the value, 1 or 0, of an electrical signal to be input. Also, the LN optical phase modulator 3 modulates the optical phase into π or 0 according to the value, 1 or 0, of an electrical signal to be input. A 10 Gb/s data signal 6 is divided into two signals, one of which is input to the LN optical intensity modulator 2 to intensity-modulate signal light, and the other of which is input to a precoder 7 and is encoded based on the relation that the output is inverted when the input is 0, as described earlier. An example of a circuit composition of the precoder 7 and an input-output logic table are shown in FIG. 9. FIGS. 10A to 10D illustrate the operation of the precoder 7 and the relation between the amplitude and phase of the modulated signal light 4. The encoded data signal 8 is input to a 0.5-bit delay circuit 9 and delayed therein, thereafter input to the LN optical phase modulator 3 to intensity-modulate the signal light. Meanwhile, the 0.5-bit delay circuit 9 is so adjusted that, considering the propagation delay time from the LN optical intensity modulator 2 to the LN optical phase modulator 3, the 0.5-bit delay phase relation between the intensity modulation and the phase modulation is obtained.

As the result of the optical modulation by the above composition and process, the measured full width at half maximum of the optical spectrum of the signal light 4 output is 5 Ghz. When signal light by standard intensity modulation is output stopping the phase modulation in the same composition, the full width at half maximum of the optical spectrum is about 10 Ghz. Thus, it is proved that the bandwidth is reduced to ½ due to the invention. When the signal light 4 is transmitted through a 1.3 μm zero-dispersion optical fiber with a length of 150 km, the dispersion deterioration after the transmission is less than 1 dB. The standard intensity-modulated signal light cannot be received at 50 km due to the waveform deterioration. Namely, it is proved that the signal light 4 produced according to the invention is durable against the dispersion.

Figure 11:
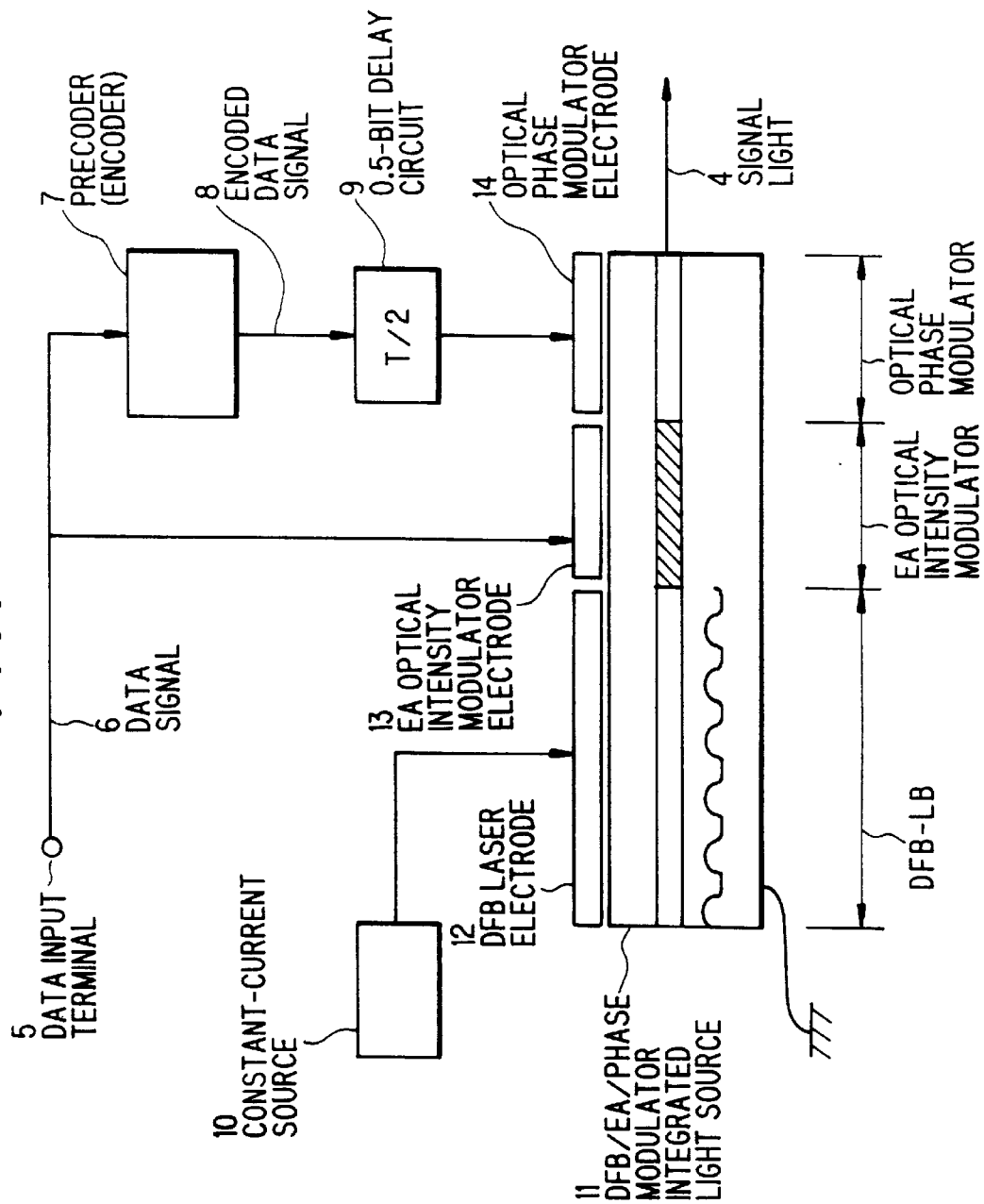
FIG. 11 is a block diagram showing an optical transmitter in a second preferred embodiment according to the invention.

A method for generating a duobinary signal and an optical transmitter using the same method in the second preferred embodiment will be explained in FIG. 11. The second embodiment is given as an example using an integrated light source 11 where an optical intensity modulator and an optical phase modulator are fabricated using semiconductor and are integrated with a distributed feedback(DFB) semiconductor laser. The optical intensity modulator used is an electric-field-absorption-type(EA) optical intensity modulator. The optical phase modulator used is a modulator of the type that the phase modulation is conducted by using the effect that a refractive index in semiconductor is varied by the application of electric field.

As the result of the modulation experiment at 10 Gb/s using the integrated light source 11, it is proved that the spectrum width and the dispersion deterioration characteristic which are similar to those in the first embodiment are obtained. Also, the integration of the light source and the optical modulator enables the miniaturization of the optical transmitter.

Figure 12:
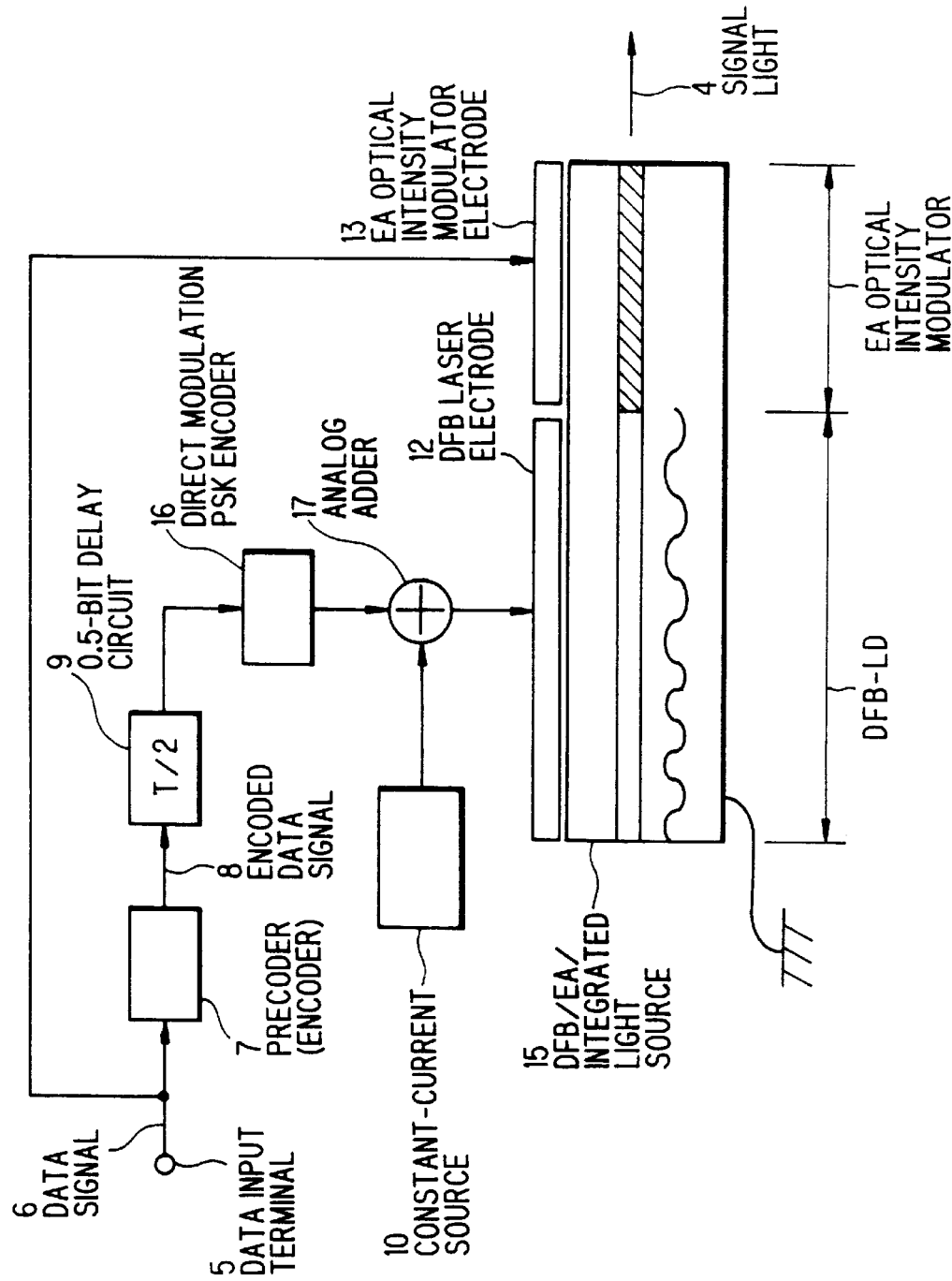
FIG. 12 is a block diagram showing an optical transmitter in a third preferred embodiment according to the invention.

A method for generating a duobinary signal and an optical transmitter using the same method in the third preferred embodiment will be explained in FIG. 12. The third embodiment is given as an example using a DFB/EA integrated light source 15 where an optical intensity modulator and a DFB semiconductor laser are integrated. Instead of the phase modulation, used is the direct modulation phase shift keying (PSK) technique where the optical phase modulation is conducted by pulsatively modulating the injection current of the DFB semiconductor laser and optical-frequency modulating. A direct modulation PSK encoder 16 generates pulses with a width shorter than 1 time slot at the rising and falling of data series to be phase-modulated, thereby optical-frequency-modulating the signal light. By adjusting the degree of frequency modulation, the modulation equivalent to the 0–π phase modulation is conducted.

As the result of the modulation experiment at 10 Gb/s using the integrated light source 15, it is proved that the spectrum width and the dispersion deterioration characteristic which are similar to those in the first and second embodiments are obtained. Also, the integration of the light source and the optical modulator enables the miniaturization of the optical transmitter.

Figure 13:
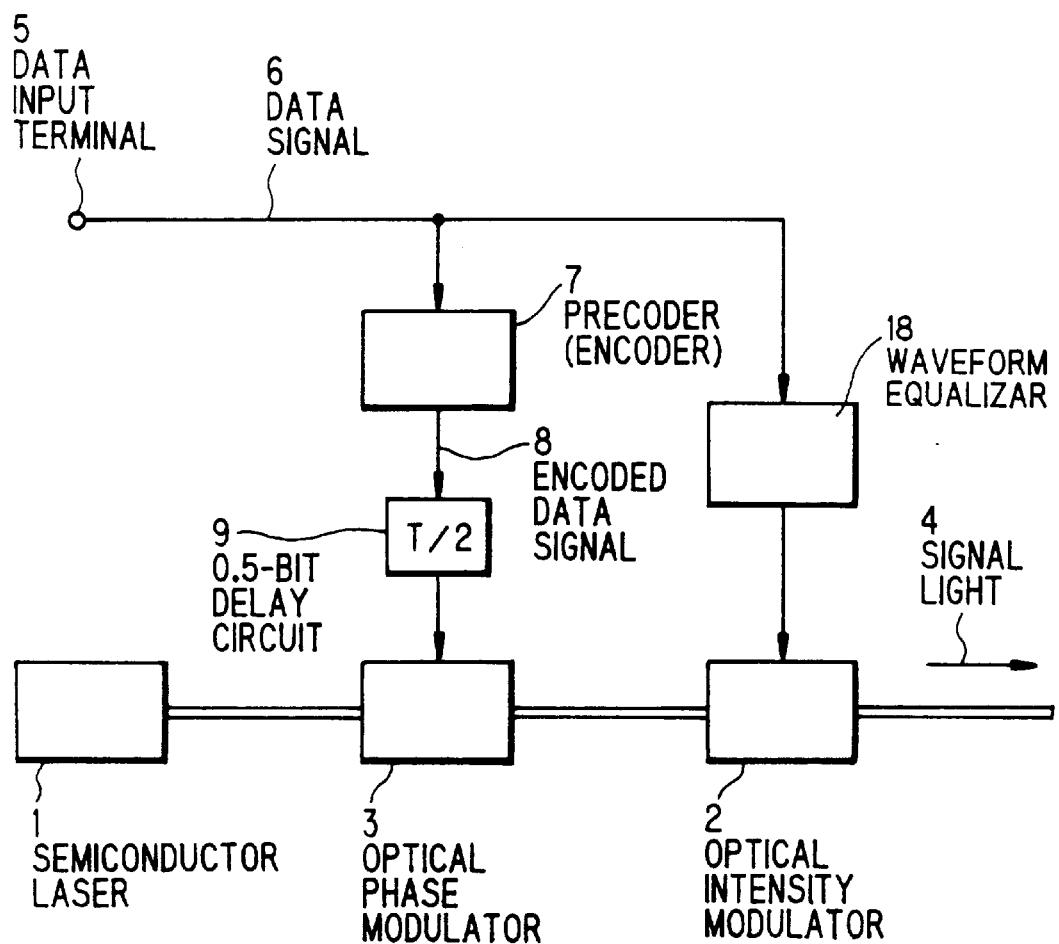
FIG. 13 is a block diagram showing an optical transmitter in a fourth preferred embodiment according to the invention.
Figure 14:
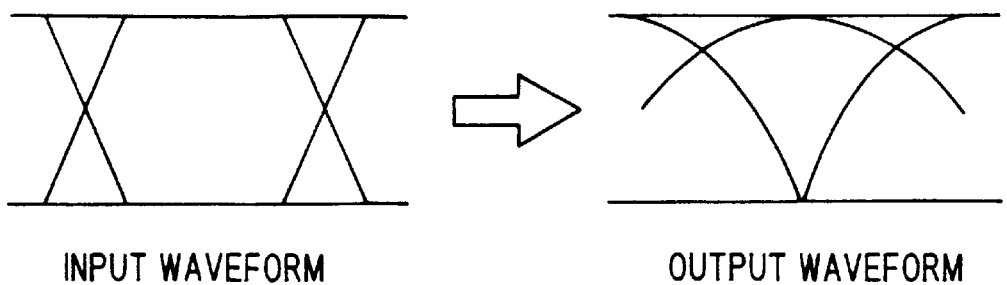
FIG. 14 is a diagram showing a waveform change by a waveform equalizer 18 in FIG. 13.

A method for generating a duobinary signal and an optical transmitter using the same method in the fourth preferred embodiment will be explained in FIG. 13. The fourth embodiment is given as an example where a data signal 6 to be input to an optical intensity modulator 2 is waveform-transformed by a waveform equalizer 18. Examples of an input waveform and an output waveform of the waveform equalizer 18 are shown in FIG. 14. As shown in FIG. 14, the cross point of data signal is moved close to a level of 1 and a level of zero is pointed properly. By the transformation of waveform, the variation of phase and amplitude at the level of zero becomes closer to that of the ideal optical duobinary signal light, and the durability against the dispersion can be enhanced.

As the result of the transmission at 10 Gb/s using the waveform equalizer 18, it is proved that, when the signal light 4 is transmitted through a 1.3 μm zero-dispersion optical fiber with a length of 200 km, the dispersion deterioration after the transmission is less than 1 dB. In contrast with this, when the waveform equalizer 18 is not used, there occurs a deterioration of 1 dB for about 150 km transmission.

Figure 15:
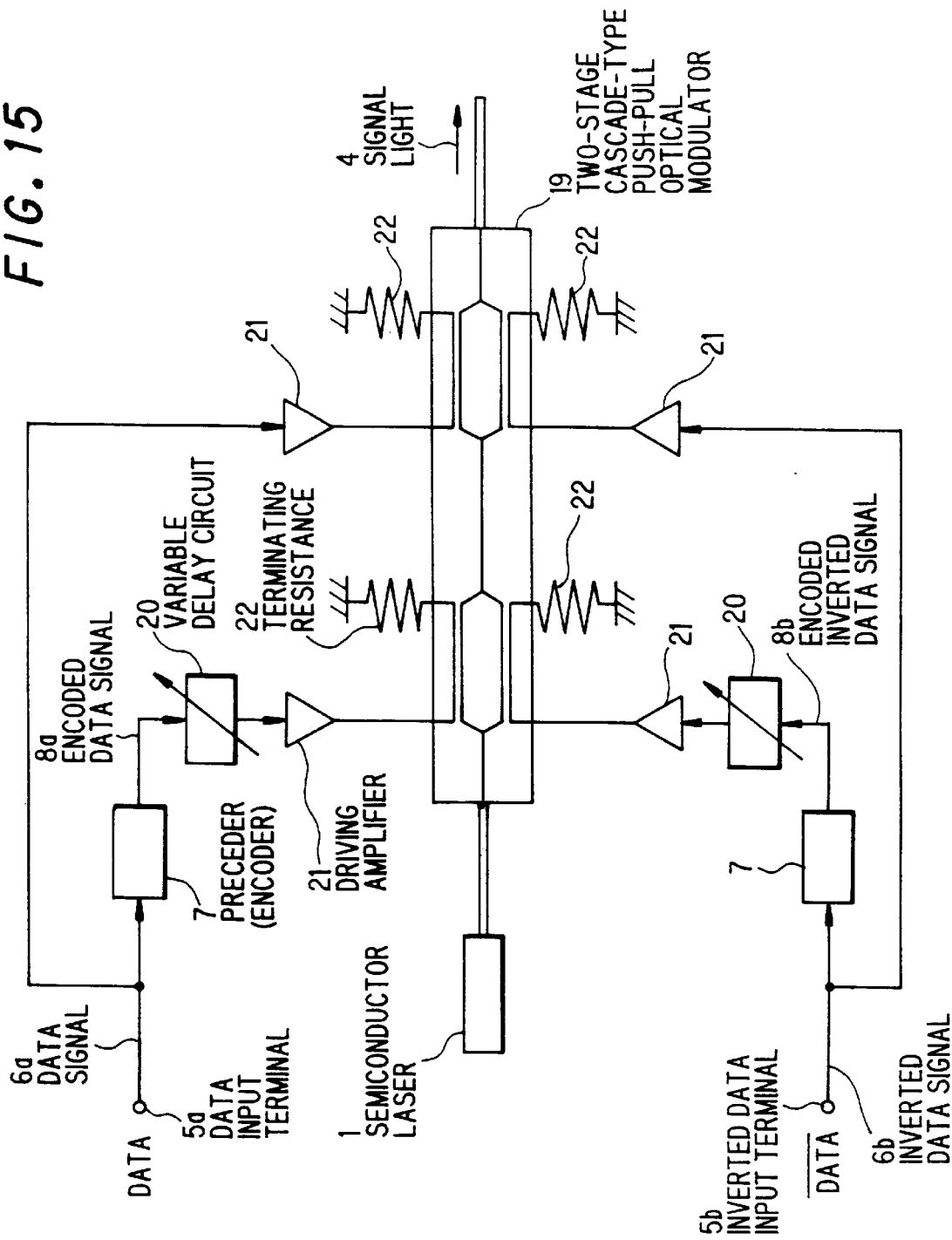
FIG. 15 is a block diagram showing an optical transmitter in a fifth preferred embodiment according to the invention.

A method for generating a duobinary signal and an optical transmitter using the same method in the fifth preferred embodiment will be explained in FIG. 15. The fifth embodiment is given as an example where an optical intensity modulator and an optical phase modulator are given by a push-pull type MZ modulator 19 which is integrated on a LN substrate. By modulating each of arms of the push-pull optical modulator 19 with $V_\pi$, it operates as an optical phase modulator, and, by modulating each of arms of the push-pull optical modulator 19 with $V_\pi/2$, it operates as an optical intensity modulator. Also, it can operate as an ideal modulator that higher harmonic components are suppressed since unnecessary chirp does not occur.

As the result of the modulation experiment at 10 Gb/s by the above composition, it is proved that, as compared with the first to fourth embodiments, components near the base of the optical spectrum are best suppressed and higher harmonic components are suppressed.

Figure 16:
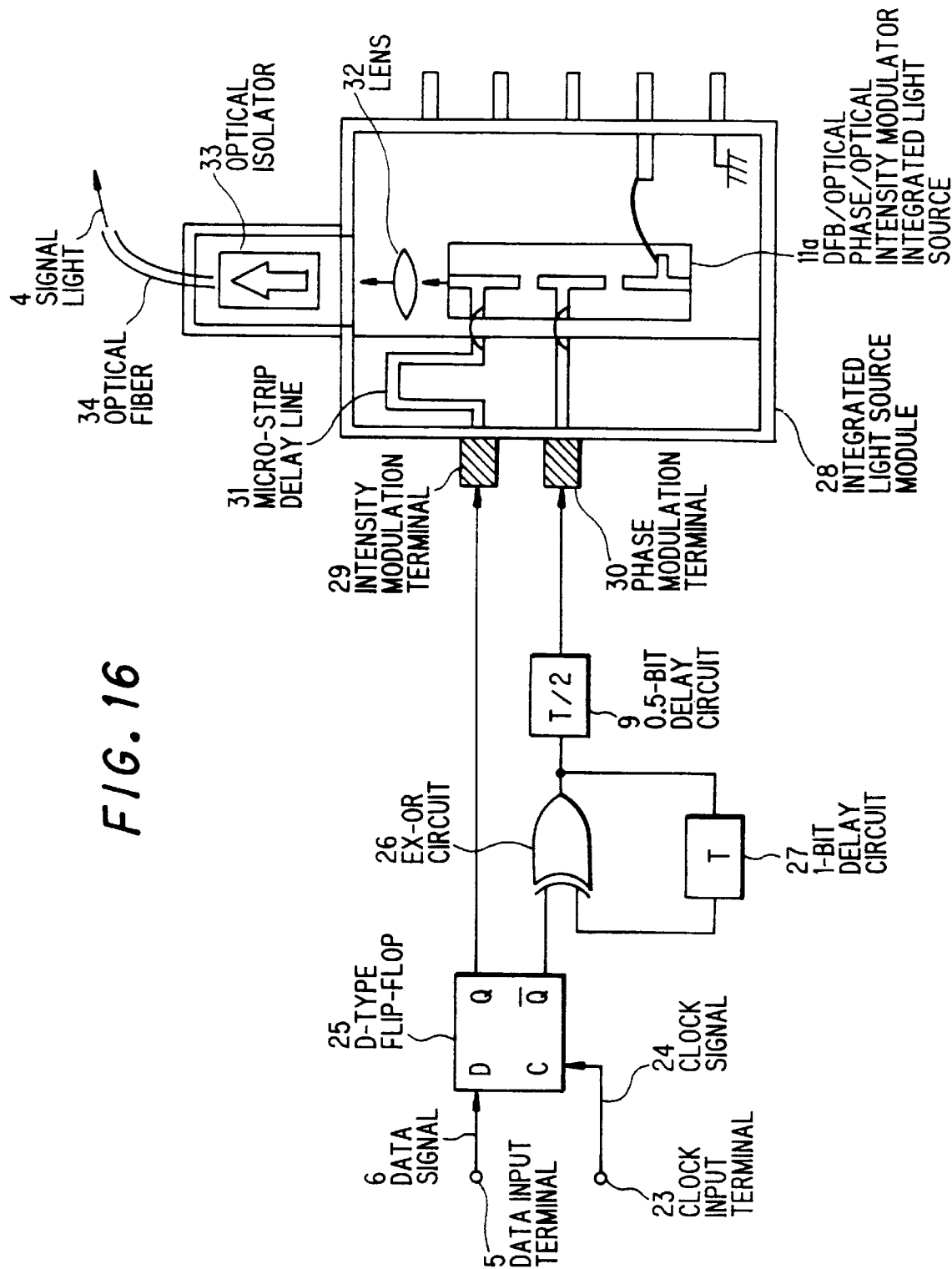
FIG. 16 is a block diagram showing an optical transmitter in a sixth preferred embodiment according to the invention.

A method for generating a duobinary signal and an optical transmitter using the same method in the sixth preferred embodiment will be explained in FIG. 16. The sixth embodiment is given as an example using a module 28 where the integrated light source 11 composed of the optical intensity modulator, optical phase modulator and DFB semiconductor laser in the second embodiment in FIG. 11 is airtightly sealed. In the integrated light source 11*a*, the positions of the optical intensity modulator and the optical phase modulator are reverse to those of the integrated light source 11. Also, a D-type flip-flop 25, where an output Q and an inverted output Q($^-$, bar) are obtained, is used to divide the data signal 6. Thereby, the effect of waveform adjustment as well as the dividing can be obtained. Meanwhile, an EX-OR circuit 26 is used since the precoder inputs the inverted output Q(bar). Also, to easily adjust the phase relation of modulated signals, at an intensity modulation terminal 29 and a phase modulation terminal 30 of the integrated light source module 28, delay time is adjusted by a microstrip delay line 31 so that the difference between the propagation delay and the wiring delay of light in the integrated light source 11*a* is zero between the intensity-modulated signal and phase-modulated signal.

As the result of the modulation experiment at 20 Gb/s by the above composition, the operation is well conducted. Also, the high-speed operation can be performed by shortening the wiring and using the small module.

Figure 17:
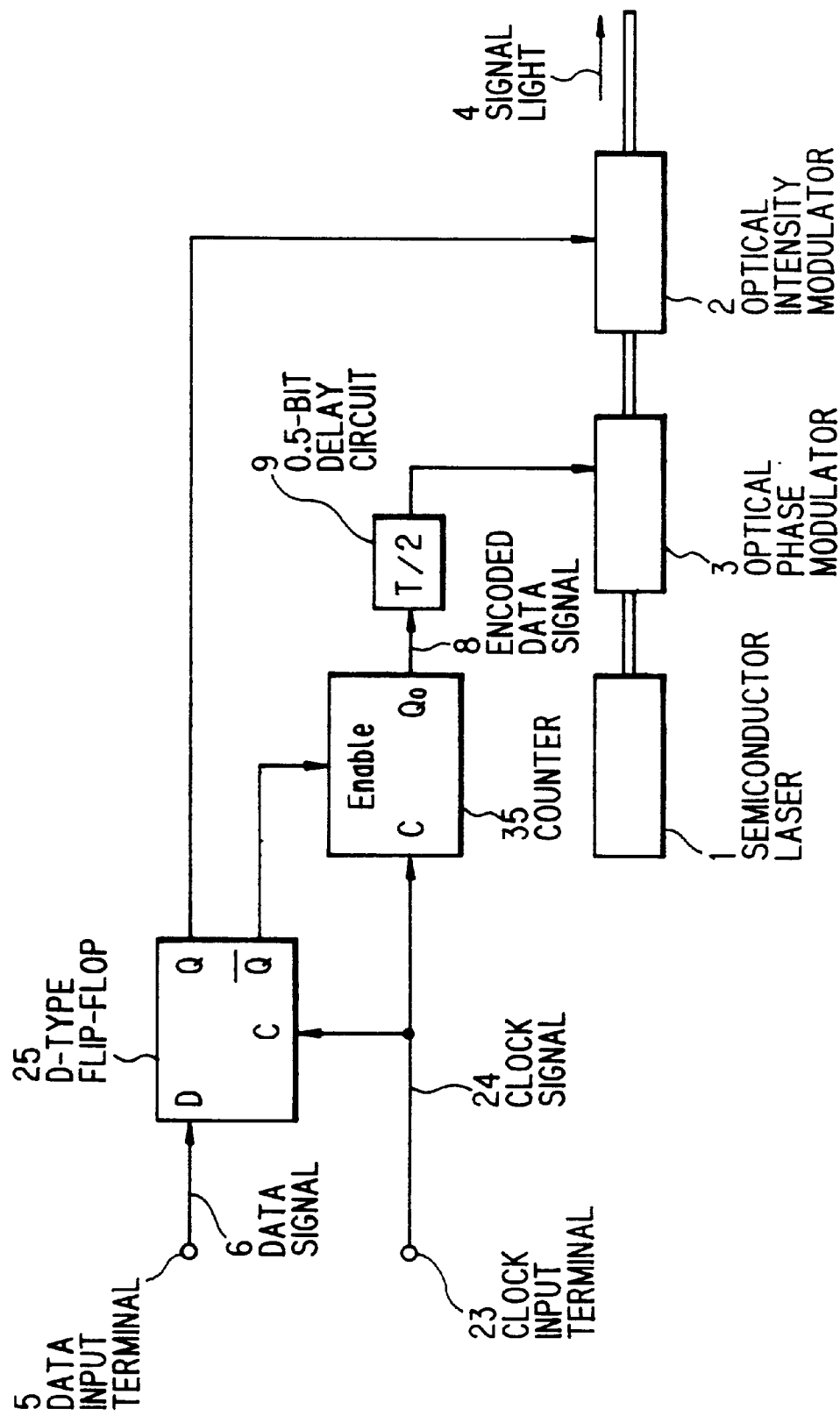
FIG. 17 is a block diagram showing an optical transmitter in a seventh preferred embodiment according to the invention.

A method for generating a duobinary signal and an optical transmitter using the same method in the seventh preferred embodiment will be explained in FIG. 17. The seventh embodiment is given as an example where the precoder is composed of a counter 35. Q(bar) output of a D-type flip-flop 25 is input to an ENABLE terminal of the binary counter 35. Namely, when the data signal 6 is 0, Q(bar) becomes 1 and then the counter 35 counts a clock signal 24. As a result, output $Q_0$, which represents the first place of the counter 35, shifts alternately between 1 and 0. Thus, it can conduct the same operation as the precoder 7 in FIG. 9.

As the result of the modulation experiment at 10 Gb/s by the above composition, it is proved that it operates like the case using the precoder composed of EX-NOR.

Figure 18:
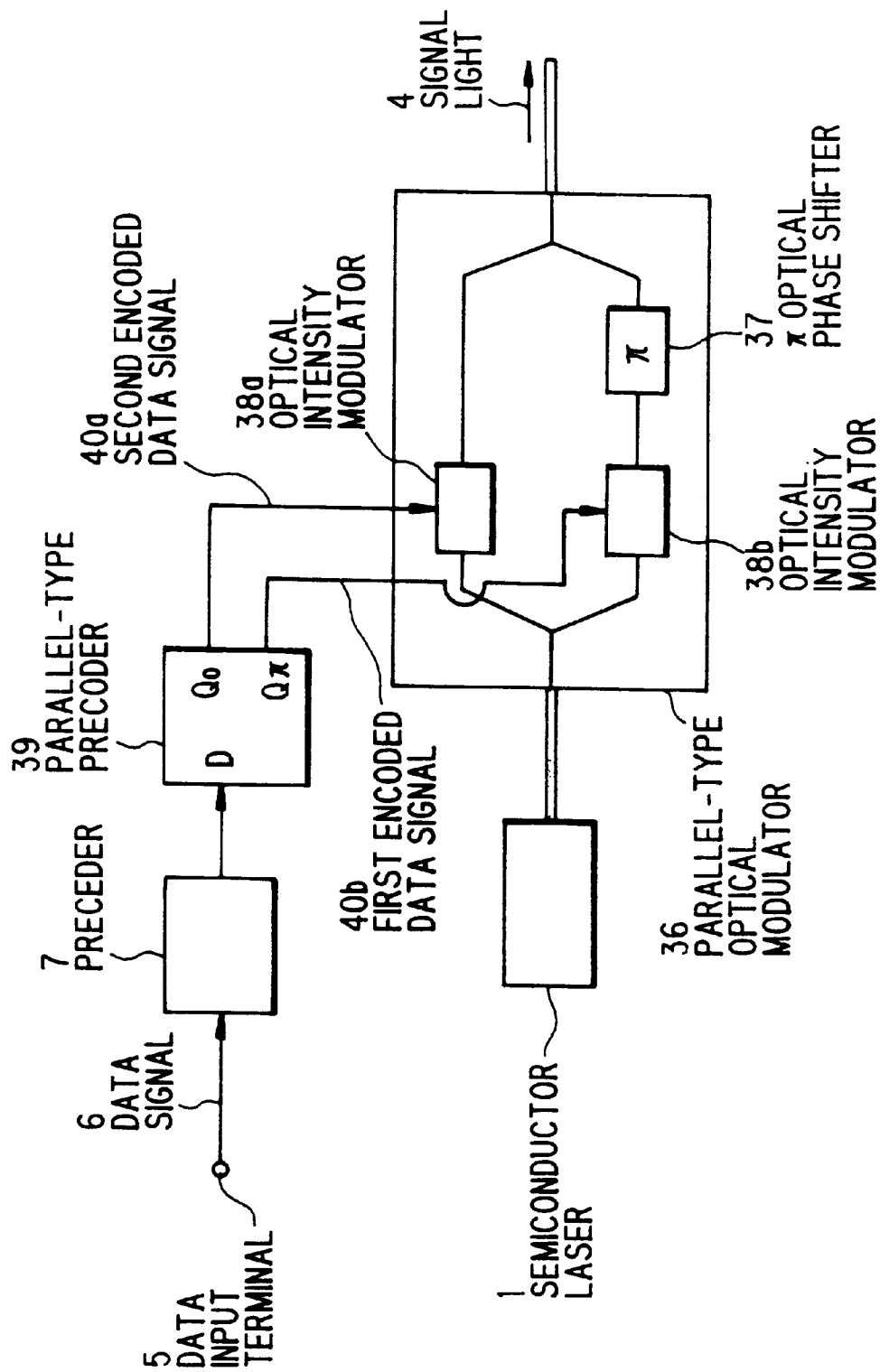
FIG. 18 is a block diagram showing an optical transmitter in an eighth preferred embodiment according to the invention.

A method for generating a duobinary signal and an optical transmitter using the same method in the eighth preferred embodiment will be explained in FIG. 18. The eighth embodiment is given as an example where two optical intensity modulators are parallel disposed, whereby two divided lights are switched individually, thereafter coupled to give signal light 4 with a phase difference of π. First, the output of a semiconductor laser 1 is input to a parallel-type optical modulator 36. Then, the light input is divided into the two lights in the parallel-type optical modulator 36, then input to the first and second optical intensity modulators 38*a* and 38*b*, respectively. One of the outputs of the first and second optical intensity modulators 38*a*, 38*b* is phase-shifted by a π optical phase shifter 37 to give the phase difference of π between the two output lights, thereafter coupled. The entire parallel-type optical modulator 36 is formed as a MZ interferometer. The data signal 6 is passed through the precoder 7 like that shown in FIG. 9, then input to a parallel-type precoder 39, therein converted into first and second encoded data signals 40*a*, 40*b*, which are input to the first and second optical intensity modulators 38*a* and 38*b*, respectively. The input-output relations in the parallel-type precoder 39 are shown in FIG. 19. The first and second encoded data signals 40*a*, 40*b* are, as shown in FIG. 18, represented by $Q_0$ and $Q_\pi$, respectively. From the current data signal D(i) and data signal 1-bit before D(i−1), the analog addition, (D(i)+D(i−1)), gives three values of 0, 1 and 2. The three values are mapped to three states, (1, π), (0, unfixed) and (1,0), where the amplitude and phase of light are represented by (A, Φ). This is conducted by using the combination of $Q_0$ and $Q_\pi$ in FIG. 19. Meanwhile, when both $Q_0$ and $Q_\pi$ are 1 and lights on both the arms are ON, the phase difference between the lights is π. Therefore, the power of the output light becomes zero when interfered at the coupling position. The input and output of the parallel-type precoder 39 as shown in FIG. 19 are given by:

$$Q_0=D(i), Q_\pi=D(i-1)$$

Figure 20:
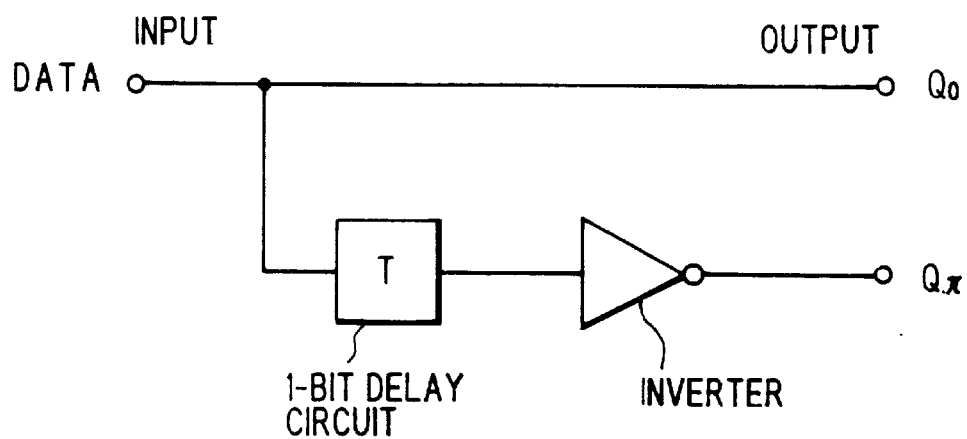
FIG. 20 is a diagram showing a first circuit composition of the precoder 39.
Figure 21:
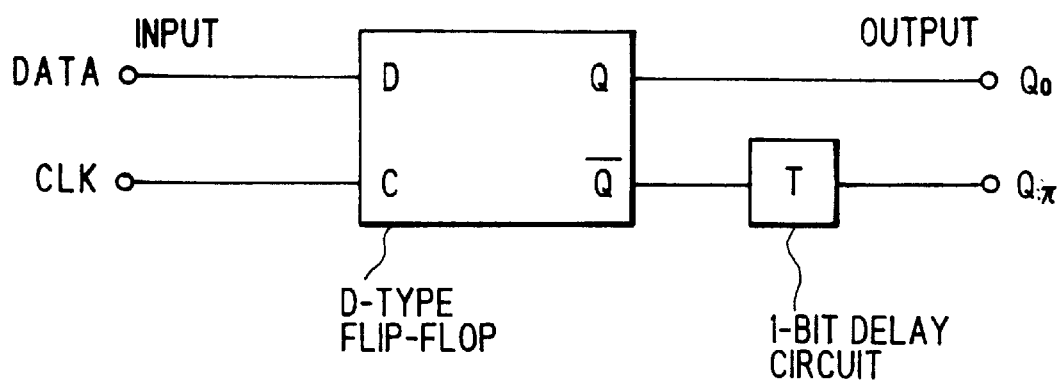
FIG. 21 is a diagram showing a second circuit composition of the precoder 39.

Circuit examples of the parallel-type precoder 39 are shown in FIGS. 20 and 21.

As the result of the modulation experiment at 10 Gb/s by the above composition, it is proved that a spectrum width and a dispersion deterioration characteristic equivalent to those in the signal light obtained by the cascade modulation in the first to seventh embodiments are obtained.

Figure 22:
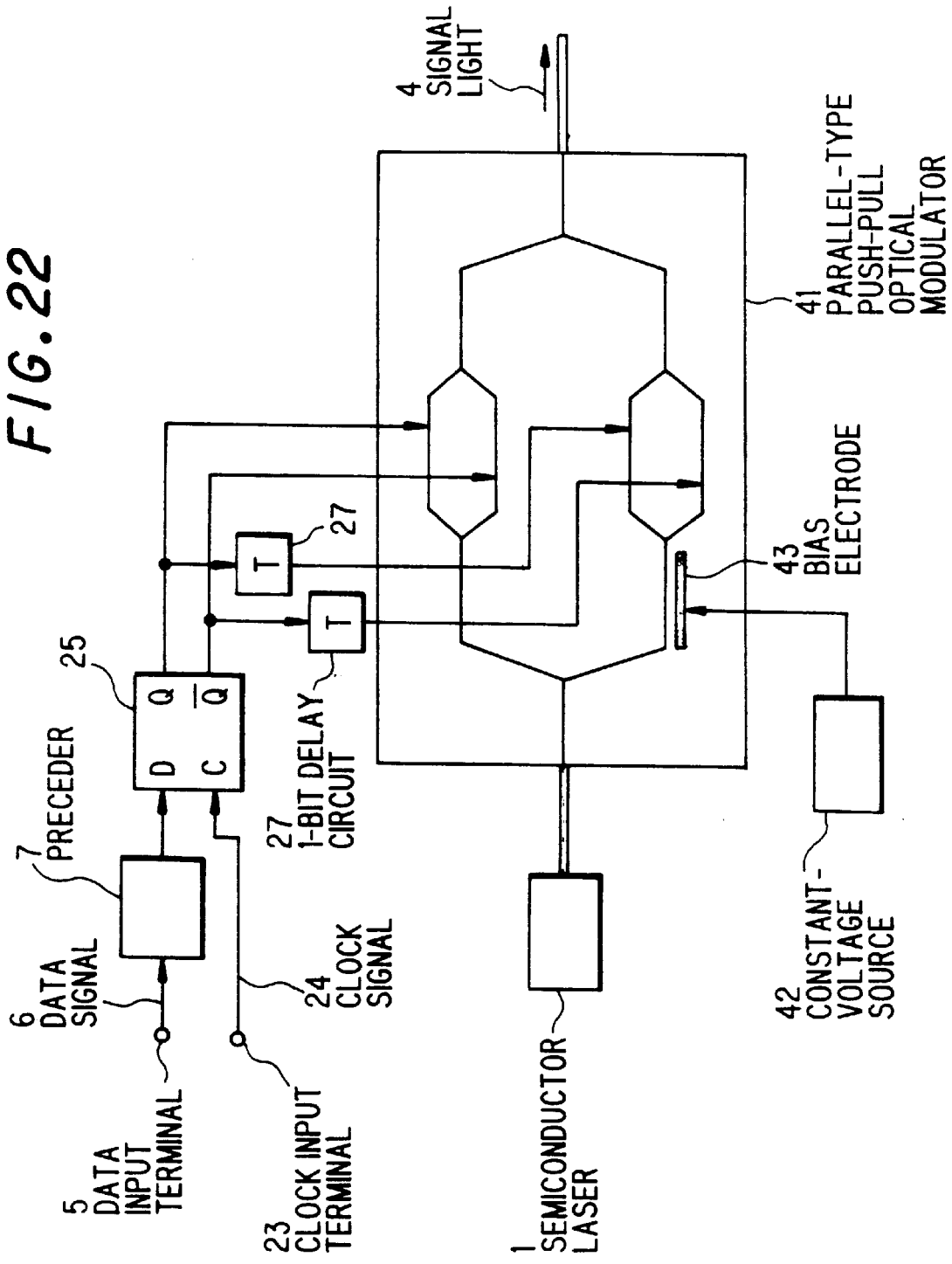
FIG. 22 is a block diagram showing an optical transmitter in a ninth preferred embodiment according to the invention.

A method for generating a duobinary signal and an optical transmitter using the same method in the ninth preferred embodiment will be explained in FIG. 22. The ninth embodiment is given as an example using a parallel-type push-pull optical modulator 41 where push-pull MZ interferometers are disposed on both the arms of a MZ interferometer. A bias electrode 43 is disposed on the optical waveguide of one of the arms, where the optical phase is shifted by π by applying a voltage. Though, in FIG. 22, a bias-voltage applying circuit for the push-pull MZ interferometers disposed on both the arms is not shown, the bias voltage is so adjusted that the intensity modulation is optimumly conducted by both the MZ interferometers. The outputs Q, Q(bar) of a D-type flip-flop 25 are individually divided into two signals. The push-pull MZ modulator for phase-zero signal light is driven Q and Q(bar), and the push-pull MZ modulator for phase-π signal light is driven by 1-bit delayed Q and Q(bar). As a result, it can operate like the logic of the parallel-type precoder 39 as shown in FIG. 19.

As the result of the modulation experiment at 10 Gb/s by the above composition, it is proved that it operates stably like the eighth embodiment.

Though the invention is explained by above embodiments, the invention is not limited to their compositions and can receive various modifications.

Also, the invention can be applied to any wavelength, while the above embodiments employ the 1.5 μm wavelength-band semiconductor laser. Furthermore, any laser, such as a gas laser, a solid-state laser and an organic laser, other than the semiconductor laser is applicable. The carrier wave can be any electromagnetic wave, such as microwave and millimetric wave, other than light.

Though the above experiments are conducted at the bit rates of 10 and 20 Gb/s, the bit rate may be higher or lower than these.

Also, any material of the optical intensity modulator can be used, while the optical intensity modulators in the embodiments use LN and semiconductor. Furthermore, other than the MZ-type and electric field absorption(EA) type modulators, any optical intensity modulators, such as acousto-optic effect type, electro-optic effect type, polarization-rotation type and non-linear effect type, which can modulate an optical intensity according to an input signal, may be used. Also, the input signal is not limited to an electrical signal, e.g., an optical intensity modulator controlled by light may be used. Also in the optical phase modulator, the material, composition, effect to be employed etc. are not limited, i.e., any type of optical phase modulators, which can modulate an optical phase according to an input signal, may be used.

Though the circuit examples of the precoder are shown in the above embodiments, any logic circuit, such as AND, OR and flip-flop, including an analog circuit, may be used.

Also, the phase inversion may be omitted when an amplitude of zero occur continuously, while the phase is always inverted when the amplitude of light is zero in the embodiments.

Though the 0.5-bit delay circuit 9 serves to delay by 0.5 bit the timing of intensity modulation and phase modulation, this delay value is not limited. Namely, when there exists a propagation delay in the connection cable, the delay value needs to be adjusted shifting from 0.5 bit. The position of the 0.5-bit delay circuit 9, which is located after the precoder in the embodiments, may be located before the precoder. Alternatively, an optical delayer may be used to delay by 0.5 bit in the optical region. The delay may be adjusted wherever the timing of intensity modulation and phase modulation can be shifted by 0.5 bit. The 1-bit delay circuit 27 can be modified as well.

Though the π optical phase shifter 37 serves to shift by π the phase difference between the two divided signal lights, this shift value is not severely limited when there exists an optical-path-length difference or birefringence on both the arms of the MZ interferometer. The π phase shift may be achieved by using the optical-path-length difference or birefringence in the optical waveguide, refractive-index variation of the modulator material by applying a current or electric field, non-linear effect etc. Also, the position of the π optical phase shifter 37 may be before the optical intensity modulator 38a or 38b, and the optical dividing or coupling part may have this function. Also, a phase difference of −π may be used.

Figure 1:
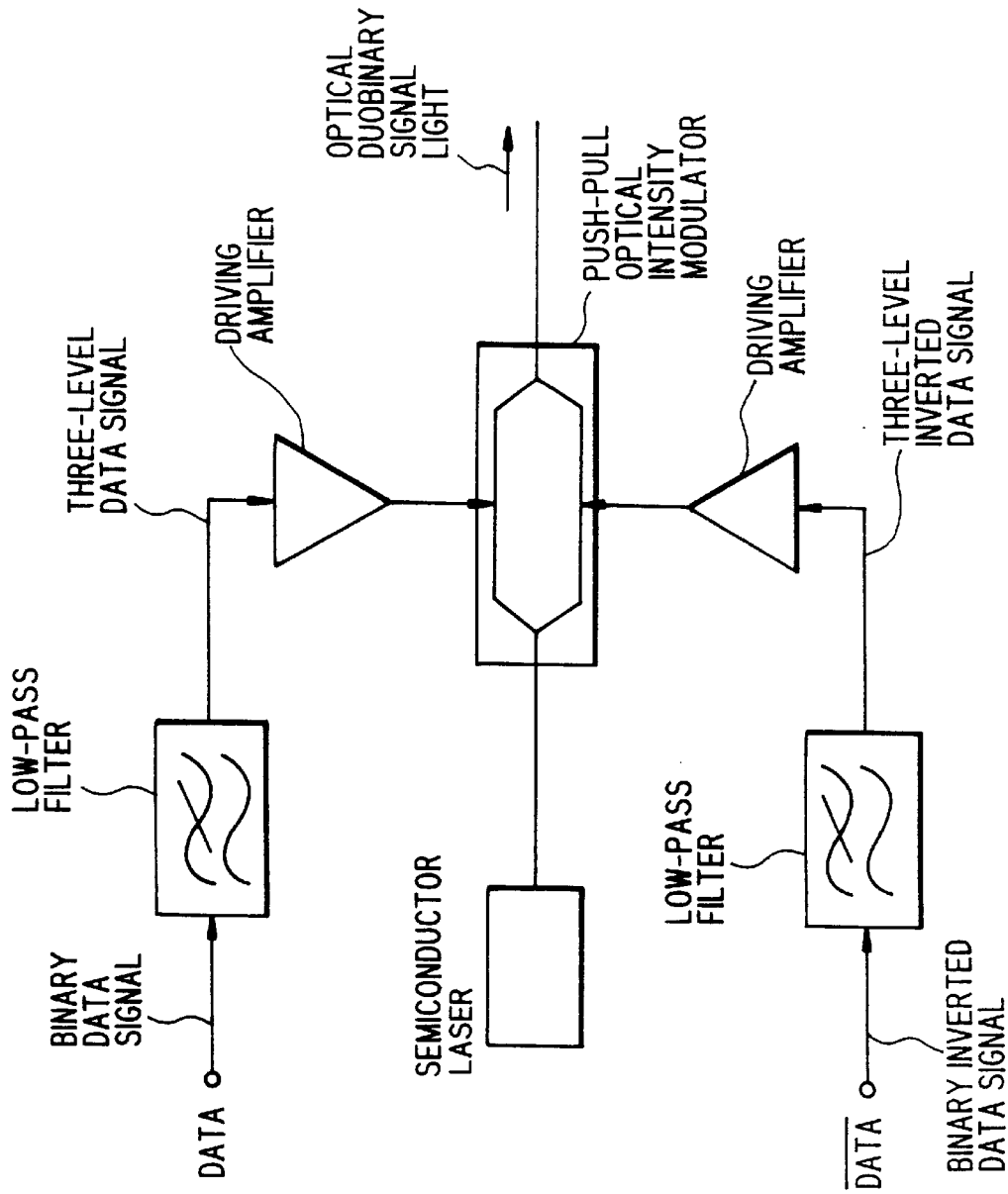
FIG. 1 is an block diagram showing a conventional optical-duobinary-manner optical transmitter.
Figure 2:
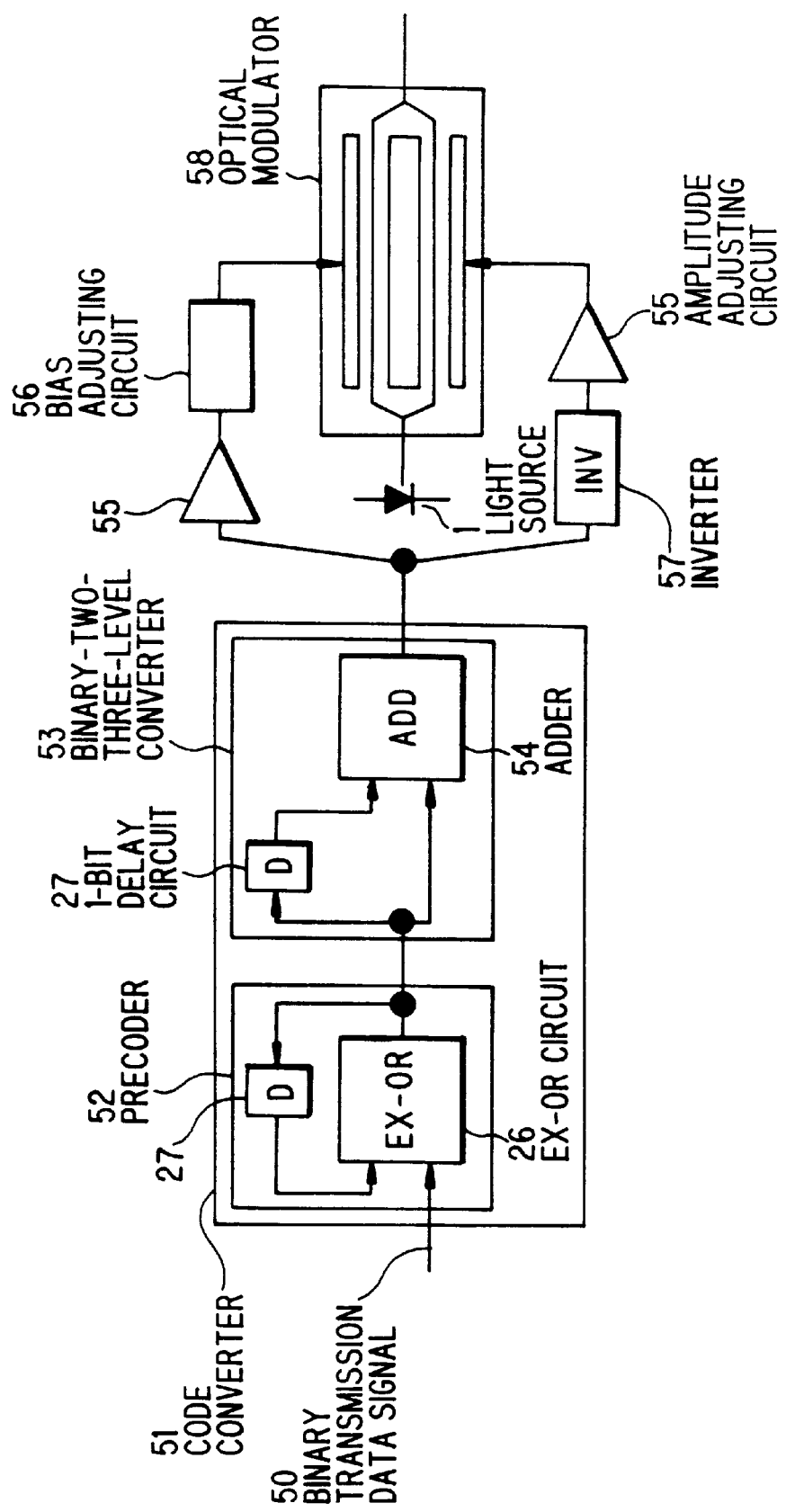
FIG. 2 is an block diagram showing another conventional optical-duobinary-manner optical transmitter.
Figure 3:
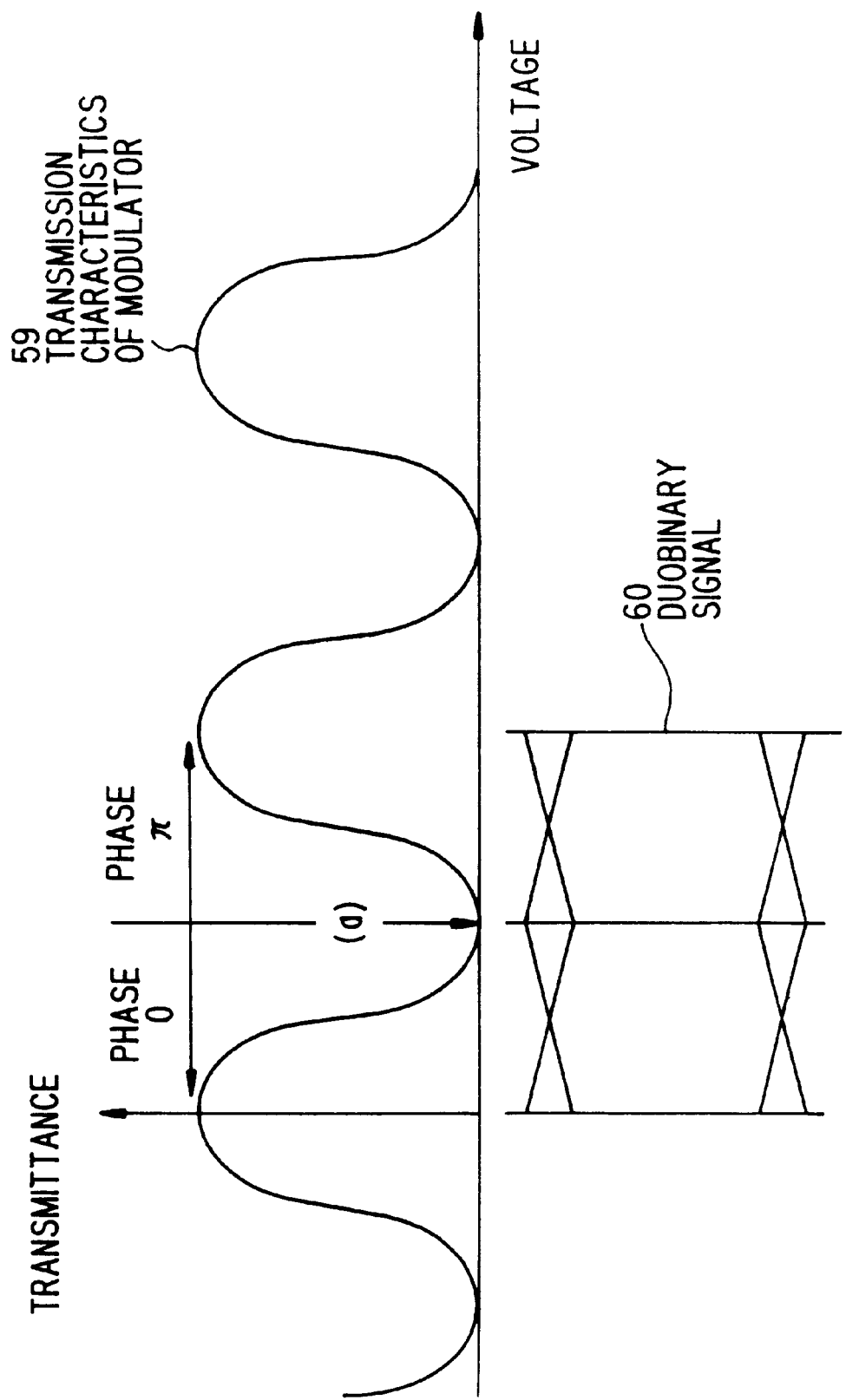
FIG. 3 is a diagram showing the setting of an operating point of LN modulator.
Figure 4:
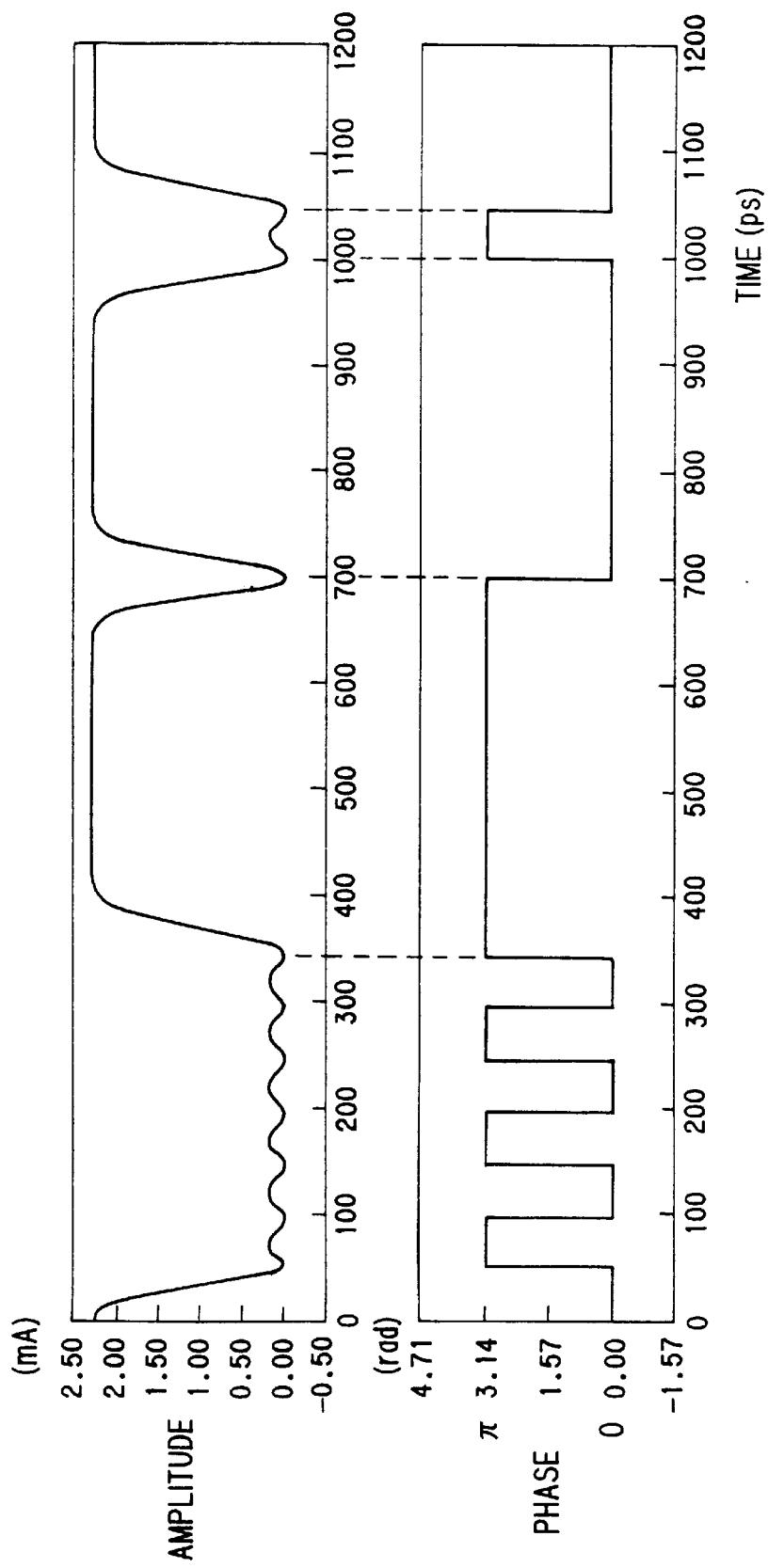
FIG. 4 is a diagram showing the calculation results of amplitude and phase of optical duobinary signal light generated by a conventional method.
Figure 5A:
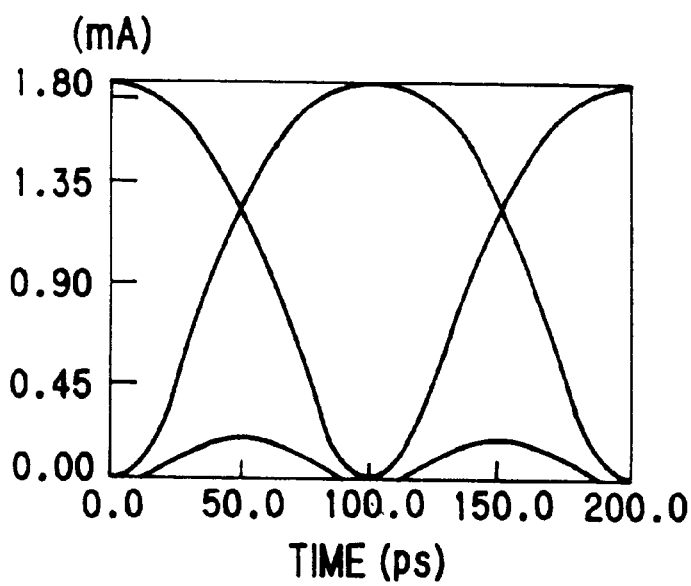
FIGS. 5A and 5B are diagrams showing an ideal duobirary signal waveform and its spectrum.
Figure 5B:
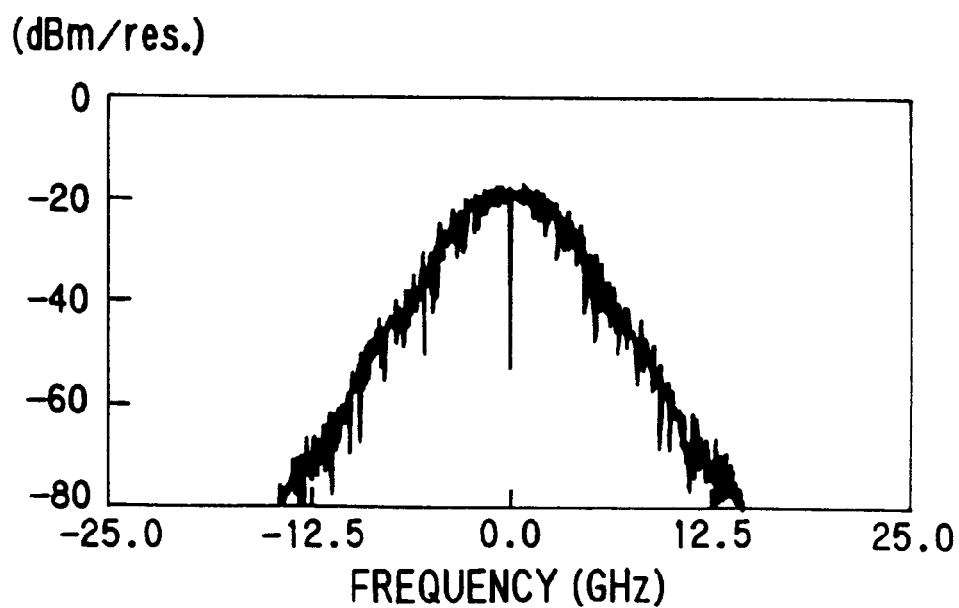
Figure 6A:
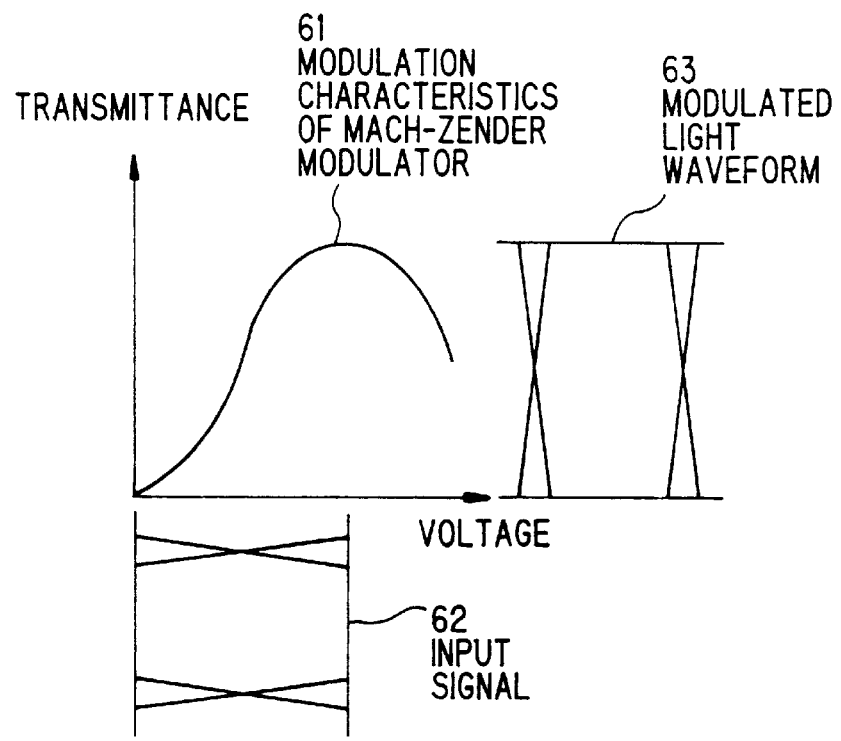
FIGS. 6A and 6B are diagrams showing the setting of two kinds of bias points in optical intensity modulation.
Figure 6B:
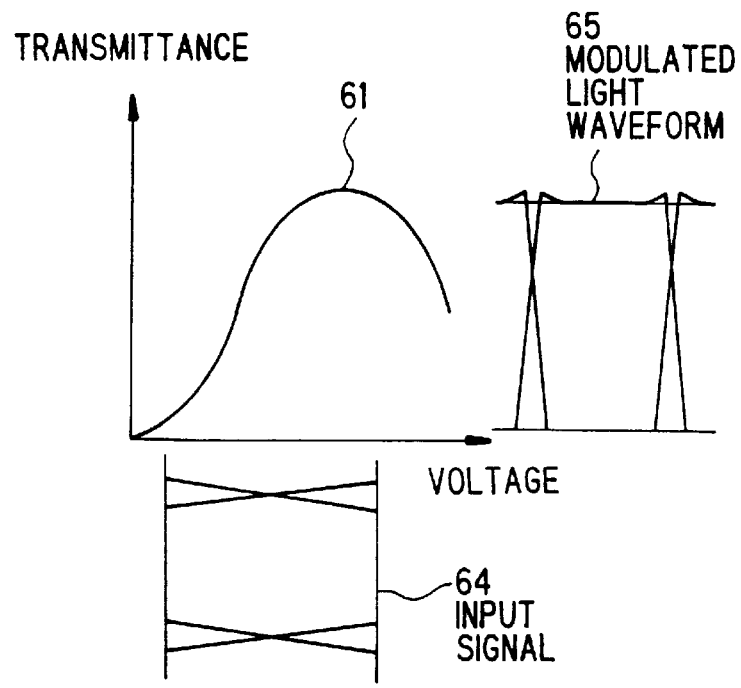
Figure 7A:
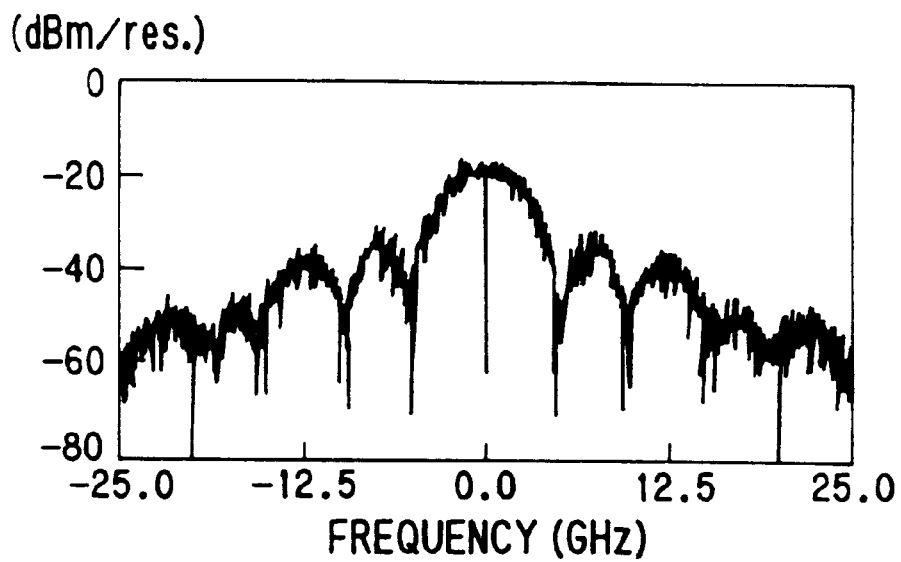
FIGS. 7A and 7B are diagrams showing the optical spectra to the two kinds of bias point.
Figure 7B:
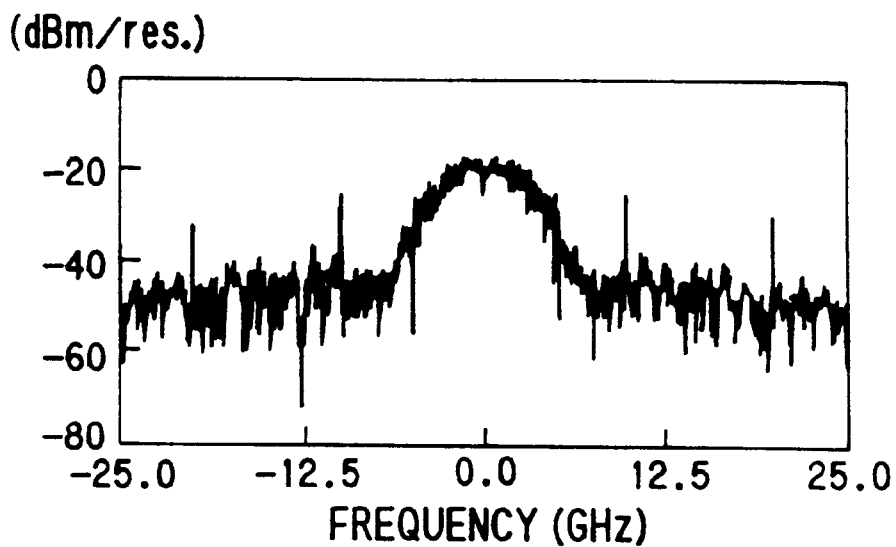
Figure 24A:
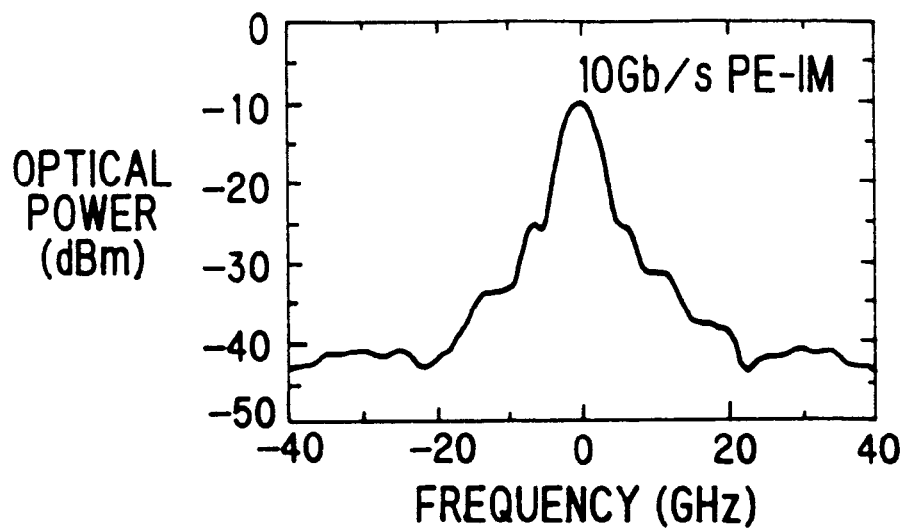
FIGS. 24A and 24B are diagrams showing an optical spectrum and a modulated light waveform in the case that optical intensity modulation in the tenth embodiment is conducted at a conventional bias point.
Figure 24B:
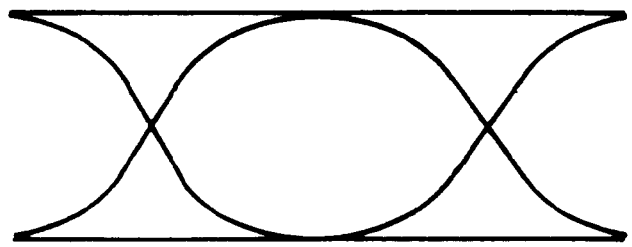
Figure 25A:
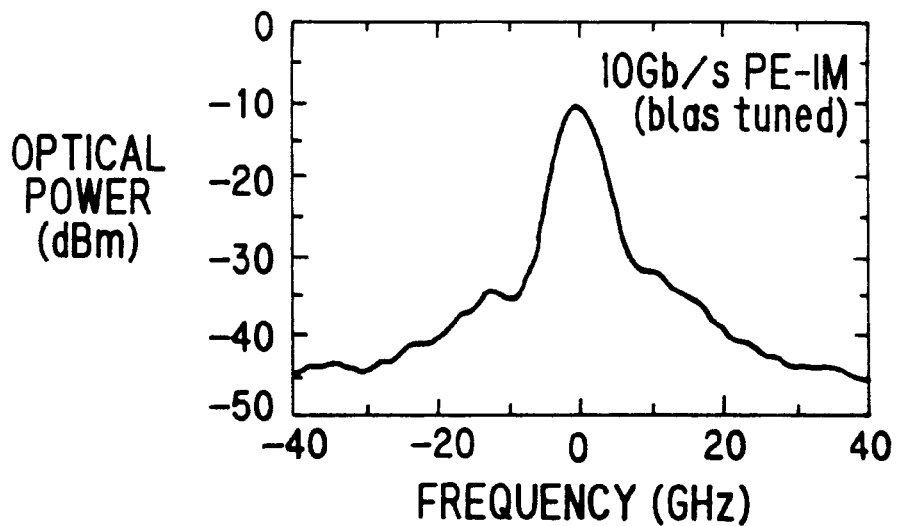
FIGS. 25A and 25B are diagrams showing an optical spectrum and a modulated light waveform in the case that optical intensity modulation in the tenth embodiment is conducted at a shifted bias point.
Figure 25B:
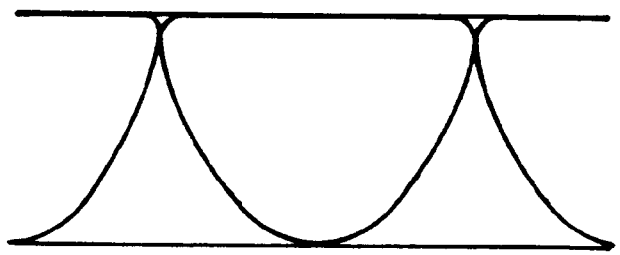

A method for generating a duobinary signal and an optical transmitter using the same method in the tenth preferred embodiment will be explained in FIG. 23. The tenth embodiment is given as an example where, in the duobinary optical transmitter of the first embodiment in FIG. 8, the bias of the MZ modulator is adjusted to obtain an ideal duobinary waveform. An optical intensity modulator 2 is provided with a bias circuit 66 which sets a modulation operating point. The bias is, as shown in FIG. 6B, set to be shifted to the side of the transmission peak from the center of the modulation characteristic 61 of the modulator. The amount of shifting is preferably about 10 to 20% of $V_\pi$. Thereby, the cross point of the optical waveform after the intensity modulation is shifted to the side of optical transmission to be close to the ideal duobinary signal waveform. The measurement results for spectrum and optical waveform of 10 Gbps duobinary modulation light generated by the above composition are shown in FIGS. 24A and 24B, respectively. On the other hand, the measurement results for spectrum and optical waveform in the case that the average of a voltage signal to be applied to the LN optical intensity modulator is conventionally set to be the center of the extinction curve are shown in FIGS. 25A and 25B, respectively. Comparing FIG. 24B with FIG. 25B, it is proved that, in this embodiment, the high-frequency components higher than 5 Ghz is suppressed.

Figure 26:
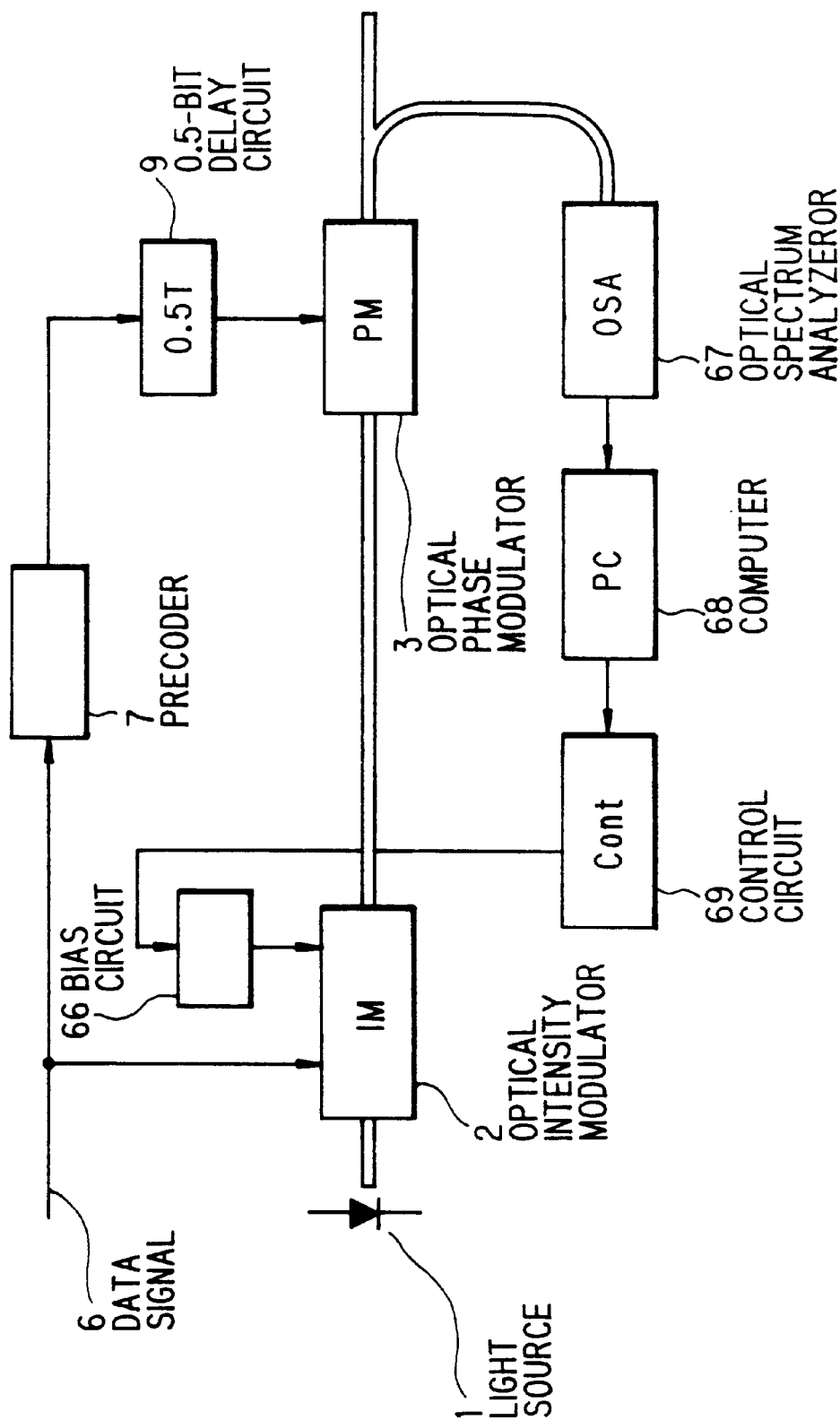
FIG. 26 is a block diagram showing an optical transmitter in an eleventh preferred embodiment according to the invention.

A method for generating a duobinary signal and an optical transmitter using the same method in the eleventh preferred embodiment will be explained in FIG. 26. The eleventh embodiment is given as an example where, to the duobinary optical modulator in FIG. 23, an optical spectrum analyzer 67 for detecting the spectrum width of light output from the modulator, a computer 68 for processing the data from the optical spectrum analyzer 67 to calculate the spectrum width of modulated light, and a control circuit 69 for controlling a voltage applied to a bias circuit 66 to minimize the spectrum width. In this composition, the bias to the optical intensity modulator 2 is controlled to minimize the spectrum width measured by the optical spectrum analyzer 67. Therefore, even when the modulation characteristic of the optical intensity modulator 2 is varied, the spectrum width is always kept to be minimum and the stable operation is thereby obtained.

Figure 27:
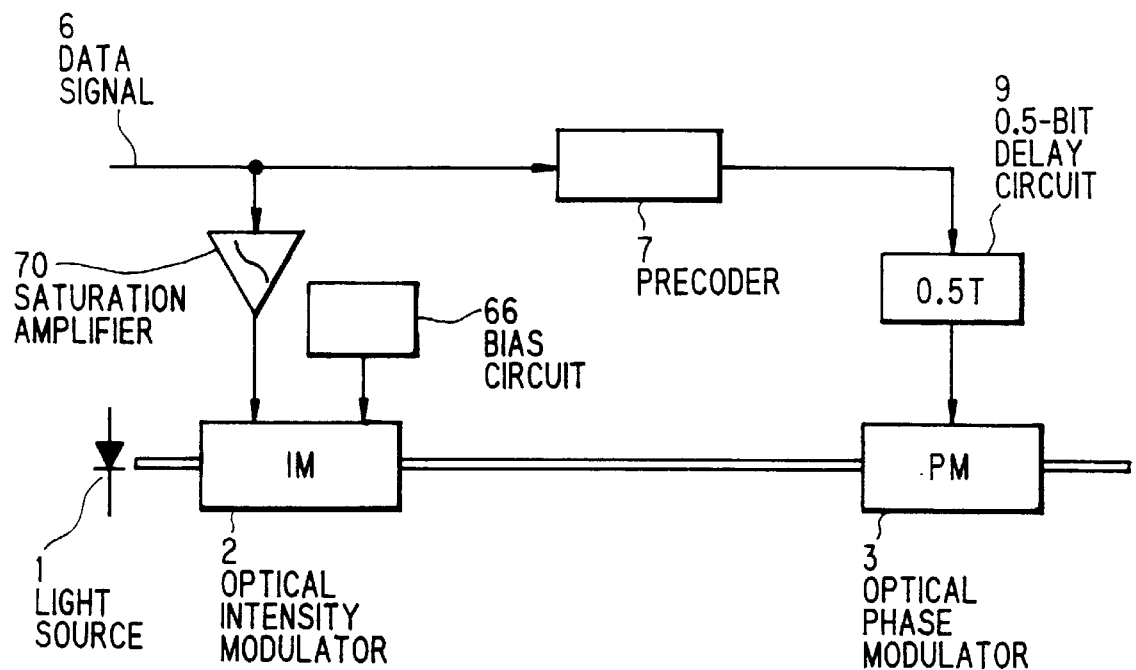
FIG. 27 is a block diagram showing an optical transmitter in a twelfth preferred embodiment according to the invention.
Figure 28:
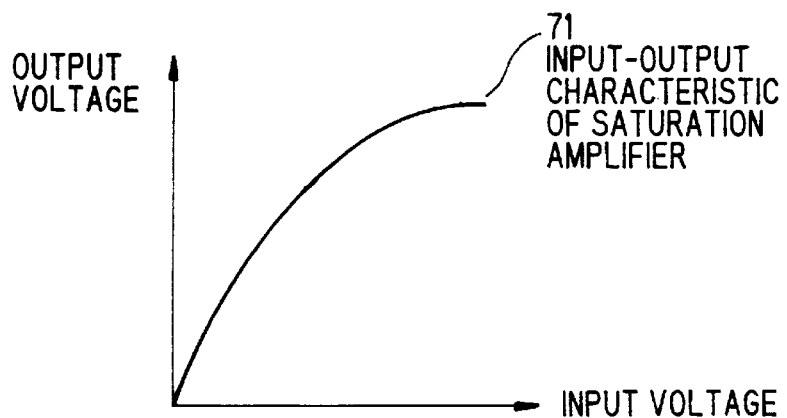
FIG. 28 is a diagram showing an input-output characteristic of a saturation amplifier in FIG. 27, FIGS. 29A to 29C are diagrams showing input and output waveforms and an optical spectrum of the saturation amplifier.
Figure 29A:
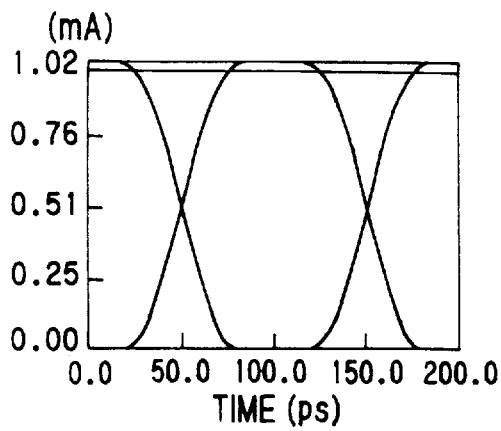
Figure 29B:
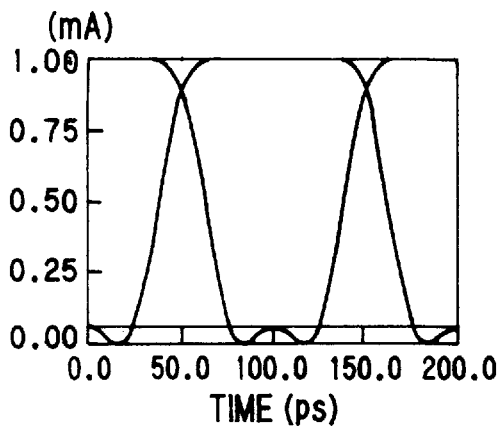
Figure 29C:
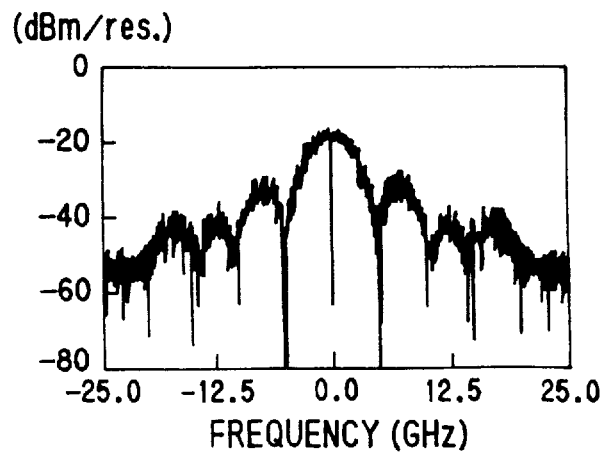

A method for generating a duobinary signal and an optical transmitter using the same method in the twelfth preferred embodiment will be explained in FIG. 27. The eleventh embodiment is given as an example where the modulation optical waveform is brought close to an ideal duobinary waveform by using a non-linear input-output characteristic of a saturation amplifier 70. The saturation amplifier 70 has the input-output characteristic 71 as shown in FIG. 28. When a binary signal as shown in FIG. 29A is input to this circuit, the cross point of the output signal is biased upward as shown in FIG. 29B, whereby the output signal close to the ideal duobinary modulation waveform is obtained. When the optical duobinary signal is generated by driving the optical intensity modulator 2 through this electrical signal, the operating point is so set that light is transmitted through when the input voltage is high and light is intercepted when the input voltage is low. By this setting, the cross point of the optical waveform after modulation is biased to the side of optical transmission and the high-frequency components of optical spectrum is reduced as shown in FIG. 29C.

Meanwhile, an electric circuit having a non-linear input-output characteristic is not limited to the saturation amplifier. For example, a combination of a diode and an amplifier can be used.

Figure 30:
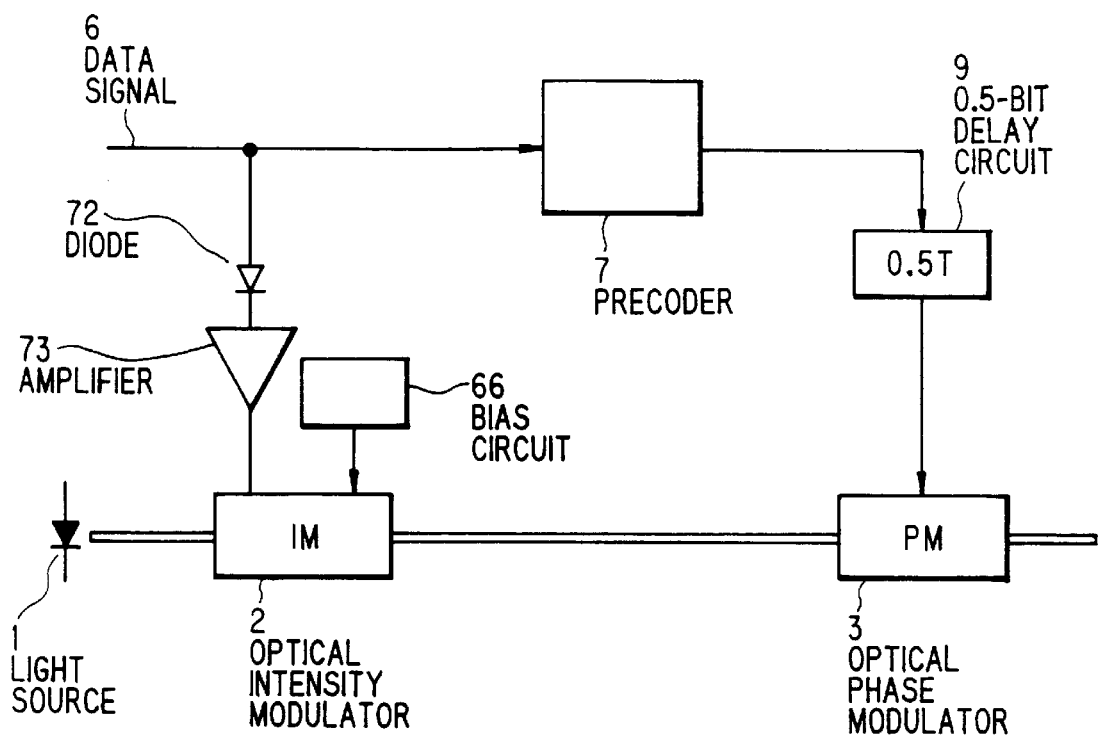
FIG. 30 is a block diagram showing an optical transmitter in a thirteenth preferred embodiment according to the invention.
Figure 31:
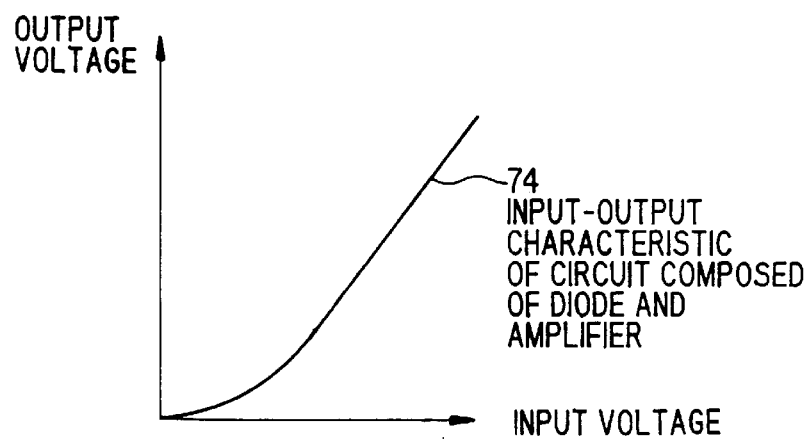
FIG. 31 is a diagram showing an input-output characteristic of a circuit composed of a diode and a amplifier in FIG. 30.

A method for generating a duobinary signal and an optical transmitter using the same method in the thirteenth preferred embodiment, which employs such a combination, will be explained in FIG. 30. The input-output characteristic 74 of a circuit where a diode 72 and an amplifier 73 are connected in series is shown in FIG. 31. Contrary to the case using the saturation amplifier, the gain is lowered where the input voltage is low. Therefore, the cross point of the output waveform is biased downward. Using this waveform, the optical intensity modulator 2 is so operated that light is intercepted when the input voltage is high and light is transmitted through when the input voltage is low. By this setting, the cross point of the optical waveform after modulation is biased to the side of optical transmission and the high-frequency components of optical spectrum is reduced.

Though, in the twelfth and thirteenth embodiments, the operation state of the optical intensity modulator is defined according to the modulation characteristic curve, it will be easily appreciated that even the reverse operation state of the optical intensity modulator is applicable by inverting the modulated waveform by inserting an inverting amplifier after the non-linear circuit.

Figure 32:
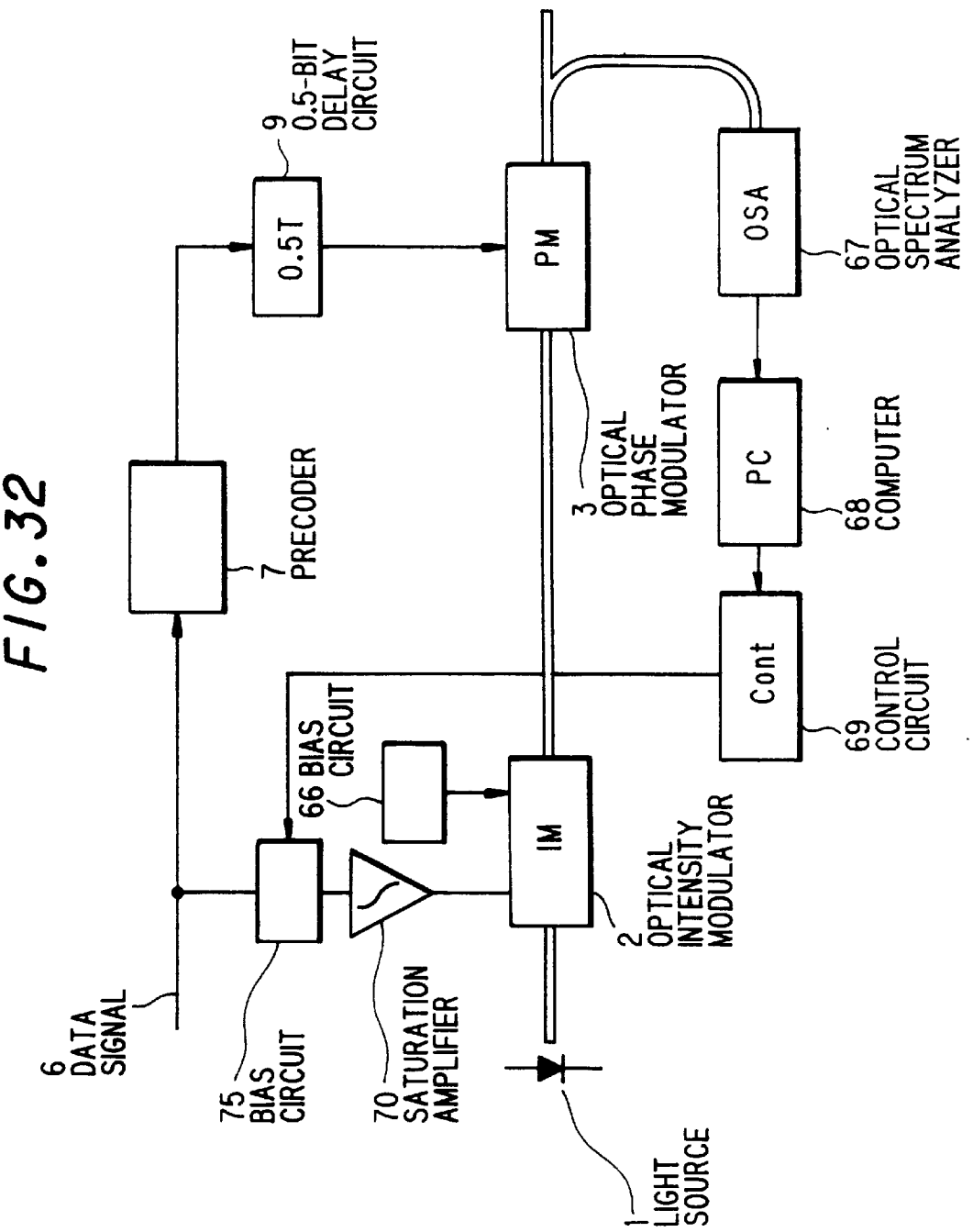
FIG. 32 is a block diagram showing an optical transmitter in a fourteenth preferred embodiment according to the invention.

A method for generating a duobinary signal and an optical transmitter using the same method in the fourteenth preferred embodiment will be explained in FIG. 32. The fourteenth embodiment is given as an example where means for detecting an optical spectrum width is provided for the output of the optical intensity modulator in the twelfth embodiment to control the bias of an input signal to the non-linear electric circuit to minimize the spectrum width. The spectrum width detecting means is composed of an optical spectrum analyzer 67, a data processing computer 68 and a control circuit 69, like the eleventh embodiment. The control circuit 69 controls the bias applied to the input signal to the non-linear circuit to minimize the spectrum width to be calculated by the computer 68. Thereby, even when the input-output characteristic of the electric circuit is varied, the modulated waveform is always kept to have a narrow spectrum width.

Figure 33:
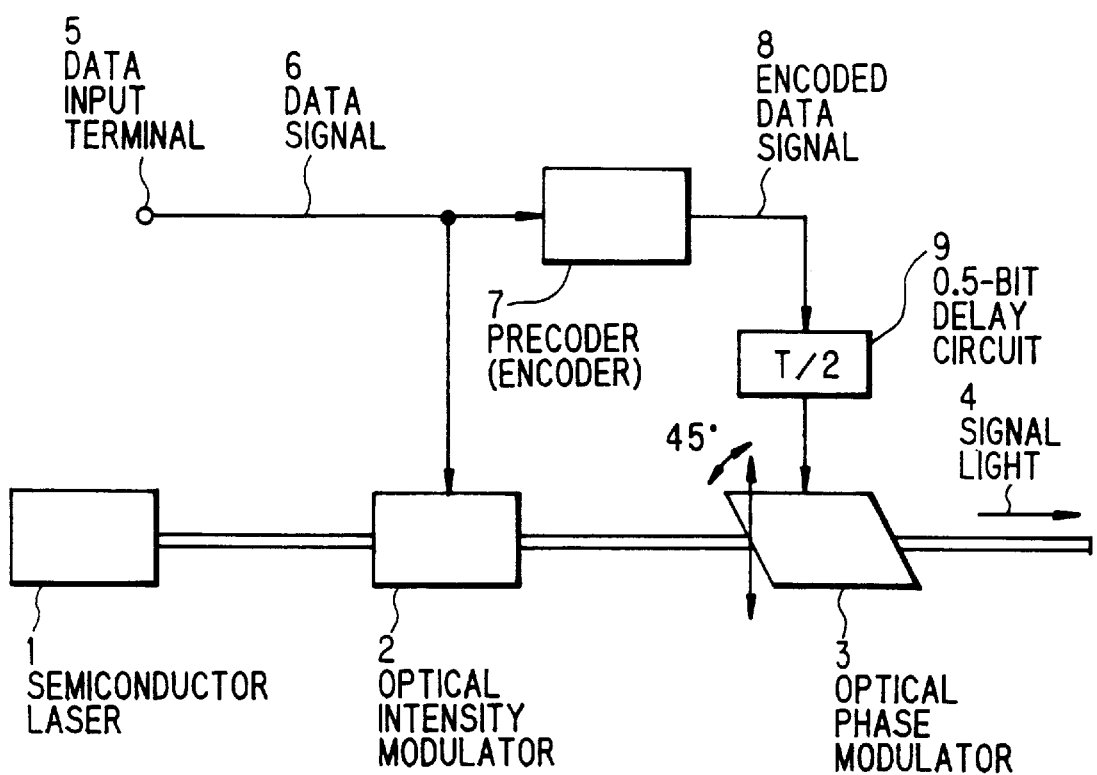
FIG. 33 is a block diagram showing an optical transmitter in a fifteenth preferred embodiment according to the invention.

A method for generating a duobinary signal and an optical transmitter using the same method in the fifteenth preferred embodiment will be explained in FIG. 33. The fifteenth embodiment is given as an example where the components of the first embodiment are used as they are and the LN optical intensity modulator 2 and the LN optical phase modulator 3 are so connected that their optical axes are inclined by 45° to each other. By inputting light while inclining by 45° the main axis of the polarization of signal light 4 to the optical axis of the optical phase modulator 3, only the component in the direction of the optical axis of the signal light 4 is phase-modulated and the component in the direction orthogonal to the optical axis of the signal light 4 is not phase-modulated. As a result, the polarization state of the signal light is polarization-modulated according to a driving signal to the optical phase modulator 3. The signal light is the sum of the phase-modulated duobinary signal and the non-phase-modulated intensity modulation signal light. Though it is not a perfect duobinary signal, the optical spectrum is a little narrowed since the component of the intensity modulation light is halved. Furthermore, since the signal light is polarization-modulated, a variation in amplification factor(polarization hole burning) depending upon polarization to be supplied etc., which is a problem of a system using an optical amplifier, can be suppressed.

As the result of the optical modulation by the above composition and process, the measured full width at half maximum of the optical spectrum of the signal light 4 output is 7.5 GHz. When signal light by standard intensity modulation is output stopping the phase modulation in the same composition, the full width at half maximum of the optical spectrum is about 10 Ghz. Thus, it is proved that the bandwidth is reduced due to the invention. When the signal light 4 is input and transmitted through an optical amplification repeating system with a total length of 1000 km which is composed of optical amplification repeaters disposed at intervals of 50 km optical fiber, it is proved that the polarization hole burning of the optical amplification repeater is suppressed due to the polarization modulation and that the optical signal-to-noise ratio(optical SNR) is improved by 3 dB compared with a case without the polarization modulation.

Though, in the fifteenth embodiment, the optical phase modulator 3 whose optical axis direction is inclined by 45° is used, an optical polarization modulator is not limited to this. For example, it may be composed by dividing the signal light into two polarized waves that are orthogonal to each other, then phase-modulating only one of the signal light through the optical phase modulator, again coupling them. Also, it is not limited to the LN phase modulator. The material may be of semiconductor, organic, inorganic, an optical fiber etc. if it is usable for the high-speed polarization modulation. The modulation manner may be electrical, magnetical, mechanical, optical etc.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A method for generating a duobinary signal, comprising the steps of:

dividing a binary data signal into a first binary data signal and a second binary data signal;

inputting said first binary data signal into an optical intensity modulator;

inputting said second binary data signal into an optical phase modulator; and modulating individually an intensity of a carrier wave, using said optical intensity modulator, and a phase of said carrier wave, using said optical phase modulator, and outputting a duobinary signal for transmission on said carrier wave.

2. A method for generating a duobinary signal, according to claim 1, wherein:

said phase is modulated by shifting by $\pi$ when said intensity is zero.

3. A duobinary-manner optical transmitter, comprising:

a laser device which outputs signal light;

an optical intensity modulator which intensity-modulates said signal light according to a first binary data signal;

a precoder which inputs a second binary data signal; and an optical phase modulator which phase-modulates said intensity-modulated signal light according to a binarm signal which is obtained by delaying by 0.5 bit an output binary signal of said precoder.

4. A duobinary-manner optical transmitter, according to claim 3, wherein:

said precoder gives its output inverted from 0 to 1 or from 1 to 0 when said data signal to be input is 0 and holds its output as it is when said data signal to be input is 1.

5. A duobinary-manner optical transmitter, according to claim 3, wherein:

at least two of said laser device, said optical intensity modulator and said optical phase modulator are integrated.

6. A duobinary-manner optical transmitter, according to claim 3, wherein:

said first data signal is input to said optical intensity modulator after its waveform is varied by a waveform equalizer.

7. A duobinary-manner optical transmitter, according to claim 3, wherein:

at least one of said optical intensity modulator and said optical phase modulator is a push-pull type optical modulator.

8. A duobinary-manner optical transmitter, according to claim 3, wherein:

said optical intensity modulator and said optical phase modulator are reversely cascade-connected.

9. A duobinary-manner optical transmitter, comprising:

a laser device which outputs signal light;

an optical intensity modulator which intensity-modulates said signal light according to a first binary data signal;

a precoder which inputs a second binary data signal; and an optical phase modulator which phase-modulates said intensity-modulated signal light according to a binary signal which is obtained by delaying by 0.5 bit an output binary signal of said precoder;

wherein a waveform of said signal light is varied by changing an operating point of said optical intensity modulator.

10. A duobinary-manner optical transmitter, according to claim 9, further comprising:

means for measuring an optical spectrum of output light;

means for calculating a spectrum width from measurement data output from said optical spectrum measuring means; and means for controlling said operating point of said optical intensity modulator;

wherein said operating point of said optical intensity modulator is controlled by said controlling means to minimize said spectrum width.

11. A duobinary-manner optical transmitter, according to claim 9, further comprising:

a device for measuring an optical spectrum of output light;

a calculator for calculating a spectrum width from measurement data output from said optical spectrum measuring device; and a controller for controlling said operating point of said optical intensity modulator;

wherein said operating point of said optical intensity modulator is controlled by said controller to minimize said spectrum width.

12. A duobinary-manner optical transmitter, comprising:

a laser device which outputs signal light;

an optical intensity modulator which intensity-modulates said signal light according to a first binary data signal;

a precoder which inputs a second binary data signal; and an optical phase modulator which phase-modulates said intensity-modulated signal light according to a binary signal which is obtained by delaying by 0.5 bit an output binary signal of said precoder;

wherein a waveform of said first binary data signal is varied through a non-linear electric circuit.

13. A duobinary-manner optical transmitter, according to claim 12, further comprising:

means for measuring an optical spectrum of output light;

means for calculating a spectrum width from measurement data output from said optical spectrum measuring means; and means for controlling a bias of said first data signal to be input to said non-linear electric circuit;

wherein said bias is controlled by said bias controlling means to minimize said spectrum width.

14. A duobinary-manner optical transmitter, according to claim 12, further comprising:

a device for measuring an optical spectrum of output light;

a calculator for calculating a spectrum width from measurement data output from said optical spectrum measuring means; and a bias controller for controlling a bias of said first data signal to be input to said non-linear electric circuit;

wherein said bias controller minimizes said spectrum width.

15. A duobinary-manner optical transmitter, comprising:

a laser device which outputs signal light;

an optical intensity modulator which intensity-modulates said signal light according to a first binary data signal;

a precoder which inputs a second binary data signal; and a phase modulator which phase-modulates said signal light according to said second binary data signal.

* * * * *